United States Patent
Ke

(10) Patent No.: US 8,117,815 B2
(45) Date of Patent: Feb. 21, 2012

(54) FIRE RETARDANT COMPOSITIONS AND METHODS AND APPARATUSES FOR MAKING THE SAME

(75) Inventor: Tung-Yuan Ke, Chung Hua Hsien (TW)

(73) Assignee: Ladama, LLC, Encinitas, CA (US)

( * ) Notice: Subject to any disclaimer, the term of this patent is extended or adjusted under 35 U.S.C. 154(b) by 1221 days.

(21) Appl. No.: 11/804,187

(22) Filed: May 16, 2007

(65) Prior Publication Data

US 2008/0113175 A1 May 15, 2008

Related U.S. Application Data

(63) Continuation-in-part of application No. 11/600,681, filed on Nov. 15, 2006, now Pat. No. 7,937,924.

(60) Provisional application No. 60/921,476, filed on Nov. 16, 2005.

(51) Int. Cl.
*D01H 4/00* (2006.01)
(52) U.S. Cl. ............................................. 57/2
(58) Field of Classification Search ........... 57/2; 19/0.3, 19/0.35, 0.51, 0.56
See application file for complete search history.

(56) References Cited

U.S. PATENT DOCUMENTS

| | | | |
|---|---|---|---|
| 2,526,526 A | 10/1950 | Weiss | |
| 2,686,339 A | 8/1954 | Holt | |
| 2,729,860 A | 1/1956 | Balkin et al. | |
| 3,134,718 A | 5/1964 | Nobile | |
| 3,615,212 A | 10/1971 | Whitney et al. | |
| 3,618,301 A | 11/1971 | Jonkoll | |
| 4,080,778 A * | 3/1978 | Adams et al. | 57/2 |
| 4,484,436 A * | 11/1984 | Nakayama et al. | 57/328 |
| 4,719,837 A | 1/1988 | McConnell et al. | |
| 4,728,395 A | 3/1988 | Boyd, Jr. | |
| 4,825,635 A | 5/1989 | Guevel et al. | |
| 4,879,168 A | 11/1989 | McCullough, Jr. et al. | |
| 4,892,772 A | 1/1990 | Su | |
| 4,903,472 A * | 2/1990 | Vanhelle | 57/12 |
| 4,957,794 A | 9/1990 | Bair | |
| 5,073,988 A | 12/1991 | Lewis, Jr. et al. | |

(Continued)

FOREIGN PATENT DOCUMENTS

JP 2003213542 A 7/2003

(Continued)

OTHER PUBLICATIONS

"PANOX-oxidized textile fiber" by SGL Carbon Group, 2004.

(Continued)

*Primary Examiner* — Shaun R Hurley
(74) *Attorney, Agent, or Firm* — Michaud-Kinney Group LLP

(57) ABSTRACT

A method and apparatus for forming yarn provides a feeding component that feeds one or more ribbons of tow starting material, a drafting component that includes at least two pairs of rollers through which the feed materials pass and which stretch-breaks the starting material into a cohesive elongated network of fibers formed from the filaments of the tow material. The stretch-broken intermediate product may be a blended cohesive network formed form multiple feed materials. The intermediate product may be spun directly into yarn in one winding/twisting operation or it may be combined with other simultaneously produced intermediate products. Various yarns may be used as produced or otherwise combined to form various fabrics and other materials used in fire-retardant and heat resistant products. The starting materials may be PAN, para- and meta-aramid fibers, viscose rayon, and stainless steel and other suitable materials.

33 Claims, 10 Drawing Sheets

U.S. PATENT DOCUMENTS

| | | | |
|---|---|---|---|
| 5,085,928 A | 2/1992 | Krueger | |
| 5,115,630 A | 5/1992 | Van Helle | |
| 5,146,835 A | 9/1992 | McConnell et al. | |
| 5,424,344 A | 6/1995 | Lewin | |
| 5,442,815 A * | 8/1995 | Cordova et al. | 2/161.7 |
| 5,503,929 A | 4/1996 | McCullough et al. | |
| 5,525,180 A | 6/1996 | Paul, Jr. et al. | |
| 5,688,577 A | 11/1997 | Smith et al. | |
| 5,731,065 A | 3/1998 | Stelzmuller et al. | |
| 6,143,819 A | 11/2000 | Nakanishi | |
| 6,156,287 A | 12/2000 | Ko | |
| 6,172,344 B1 | 1/2001 | Gordon et al. | |
| 6,287,686 B1 | 9/2001 | Huang et al. | |
| 6,348,263 B1 | 2/2002 | Hatano et al. | |
| 6,358,608 B1 | 3/2002 | Hanyon et al. | |
| 6,477,740 B1 | 11/2002 | Hansen | |
| 6,562,415 B2 | 5/2003 | Ruepping | |
| 6,593,428 B2 | 7/2003 | Dean | |
| 6,599,586 B2 | 7/2003 | Ruepping | |
| 6,602,557 B2 | 8/2003 | Ruepping | |
| 6,602,600 B2 | 8/2003 | Zhu | |
| 6,638,883 B2 | 10/2003 | Gaffney et al. | |
| 6,667,358 B1 | 12/2003 | Aoyama | |
| 6,670,291 B1 | 12/2003 | Tompkins et al. | |
| 6,733,846 B2 | 5/2004 | Ruepping | |
| 6,740,688 B2 | 5/2004 | Ruepping | |
| 6,746,723 B2 | 6/2004 | Paglia et al. | |
| 6,790,795 B2 | 9/2004 | Erb, Jr. et al. | |
| 6,800,367 B2 | 10/2004 | Hanyon et al. | |
| 6,803,391 B2 | 10/2004 | Paglia et al. | |
| 6,812,171 B2 | 11/2004 | Shimazaki et al. | |
| 6,894,134 B2 | 5/2005 | Brookhart et al. | |
| 7,029,618 B2 | 4/2006 | Pelosi et al. | |
| 7,087,300 B2 | 8/2006 | Hanyon et al. | |
| 7,100,246 B1 * | 9/2006 | Perrotto et al. | 19/0.35 |
| 7,107,750 B2 | 9/2006 | Thiriot | |
| 7,188,462 B2 | 3/2007 | Hendrix et al. | |
| 2001/0033035 A1 | 10/2001 | Panter et al. | |
| 2004/0096629 A1 | 5/2004 | Aneja et al. | |
| 2004/0109991 A1 * | 6/2004 | Guevel et al. | 428/298.1 |
| 2005/0025950 A1 | 2/2005 | Hanyon et al. | |

FOREIGN PATENT DOCUMENTS

| | | |
|---|---|---|
| JP | 2004176233 A | 6/2004 |
| WO | WO2004/076730 A2 | 9/2004 |

OTHER PUBLICATIONS

"Flame Resistant Fiber (Pre-oxidized Acrylic Fiber) Lastan" by Asahi Chemical Industry Co., Ltd, prior to 2005.

Panchanan Pramanik & Ruby Chakraborty, The Unique Story of a High-Tech Polymer, Jun. 2004.

* cited by examiner

FIRE RETARDANT COMPOSITIONS AND METHODS AND APPARATUSES FOR MAKING THE SAME

RELATED APPLICATIONS

This application is a continuation in part of and claims priority to U.S. Pat. application Ser. No. 11/600,681, filed Nov. 15, 2006 now U.S. Pat. No. 7,937,924 which claims priority to expired U.S. provisional patent application Ser. No. 60/921,476, filed Nov. 16, 2005, the contents of each of which are hereby incorporated by reference as if set forth in their entireties.

FIELD

The subject matter pertains to fire retardant compositions and methods and apparatuses for making the same, and more particularly to carbon-based fire retardant and heat resistant compositions, including rovings, yarns, fabrics, and products made therefrom including but not limited to coverings, upholstery, clothing and other protective apparel, insulations, sleeves, ropes, barriers, blankets, masks, filtration systems and textiles. The materials produced by the invention find particular application in the motor sports industry, the automotive and aircraft industries, home furnishings, filtration systems, industrial protection materials, military, police and homeland security applications and in the firefighting industry. The invention also relates to an intermediate product comprising, consisting essentially of, or consisting of, a cohesive elongated network of fibers used to form yarn. The inventions also relates to methods and machines for producing fire retardant and heat resistant compositions and intermediates.

BACKGROUND

The following description includes information that may be useful in understanding the present invention. It is not an admission that any of the information provided herein is prior art, or relevant, to the presently described or claimed invention, or that any publication or document that is specifically or implicitly identified is prior art or a reference that may be used in evaluating patentability.

A fire retardant is a substance that helps to delay or prevent combustion. See Horrocks, A. R., Fire Retardant Materials (2001). Fire retardant clothing, for example, is widely used to protect persons who are exposed to fire, particularly suddenly occurring and fast burning conflagrations. These include persons in diverse fields such as race car drivers, military personnel and fire fighters, each of which may be exposed to deadly fires and extremely dangerous incendiary conditions without notice. For such persons, the primary line of defense against severe burns and even death is the protective clothing worn over some or all of the body.

Materials such as carbon fiber materials and aramid fiber materials have been used to form fire retardant materials for the manufacture of clothing. Carbon fibers are typically in the form of long bundles of linked graphite plates that form a crystal structure lying parallel to the fiber axis. Carbon fibers are anisotropic and their elastic modulus is higher in the direction of the axis than it is in other directions. In other words, the individual fibers can withstand pulling, i.e., they can stretch before breaking, in the axial direction to a greater extent than they can withstand bending at an angle to the axis or lateral stretching. Most carbon fiber materials are made from thousands of individual filaments and include thousands of fibers.

Carbon fiber materials have advantageous mechanical, physical and chemical properties. In addition to being non-flammable, they are light, stiff and strong. The strength of a carbon fiber is comparable to that of steels and the stiffness of carbon fibers is generally greater than metal, ceramic or polymer-based materials. Carbon fibers have other desirable properties such as excellent corrosion and fatigue resistance and dimensional stability. Carbon fibers and their composites are therefore well suited for applications in which chemical inertness, strength, stiffness, lightness, and fatigue resistance are important requirements. For example, in the aerospace and defense industries, materials made of carbon fibers have been increasingly used both in the interior of aircrafts as flame resistant materials and as critical structural components to increase fuel efficiency and enhance structural strength.

Carbon fiber materials may be advantageously combined with further materials to form yarns, fabrics or other products that exhibit the advantageous qualities of both the carbon fiber materials and the further material. The carbon fibers may be combined with other materials at the yarn level to form a yarn having characteristics of both carbon fiber and the other additive material. Such may be a blended yarn. Carbon fibers may also be formed into a fabric that is used in conjunction with other fabrics to impart the desired combination of characteristics.

Carbon fibers may be produced from a variety of precursor materials. Among these precursor materials are polyacrylonitrile (PAN), petroleum or coal tar pitch and certain phenolic fibers. Cellulosic fibers such as rayon and cotton may also be used as additives. Different precursor materials produce carbon fibers with different morphologies and different specific characteristics. PAN-based carbon fiber materials exhibit superior tensile strength, are comparatively low in cost, and are well suited for use in the construction of consumer goods such as sporting goods and high-performance apparel.

Various methods are known for producing carbon fibers from various precursor materials. Such methods include pyrolytic processes and pyrolysis. It is well established that the mechanical properties of carbon fibers are improved by increasing their crystallinity and the molecular order within the fiber. One way to increase crystallinity and structural order is through a process of stabilization and carbonization through tension. One common pyrolysis reaction is an oxidative stabilization process in which a carbon fiber is treated at about 200-300° C. under tension in an oxidizing environment. During the process, oxygen, nitrogen and/or hydrogen is removed from the fiber, resulting in an increase of carbon content in the fiber. In addition to preventing fiber shrinkage, the tension applied during this process maintains the molecular orientation and order of the fiber, which in turn increases the tensile strength of the stabilized fiber.

During pyrolysis of PAN, the oxidation and stabilization induces intramolecular cyclization of the oriented molecules with the release of most of the hydrogen and part of the nitrogen from the fibers. The resulting PAN polymers are called "oxidized PAN" and oxidized PAN typically has a carbon content of about 55-68% and a density of about 1.30 to 1.50 g/cm$^3$. Oxidized PAN fibers have several advantages as flame resistant materials. Oxidized PAN fibers exhibit excellent heat insulation properties and low thermal conductivity. Oxidized PAN fibers also have a high limiting oxygen index (LOI), typically between 40-60% oxygen making them more flame resistant than many other organic fibers. Moreover, textiles that include strands of oxidized PAN fibers, unlike other flame resistant organic fibers, retain their appearance and textile characteristics after open flame exposure. Oxidized PAN fibers are electrically nonconductive and function as effective electrical insulators even after exposure to heat and open flames. Oxidized PAN fibers also exhibit excellent chemical resistance to organic solvents and most acids and bases. Moreover, oxidized PAN fiber strands are softer, more pliable and malleable than strands of pure carbon fibers. As such, oxidized PAN fiber strands are well suited for use in heat resistant thermal insulations and textiles for high technology applications, either alone or as part of a composite material, and have been used in composite fire blocking fabrics for seating in the aerospace and automobile industries and in the manufacture of composite fire retardant and protective clothing for people exposed to the danger of an open flame.

Currently, there are at least three types of oxidized PAN materials available commercially: staple fibers, large filament tow materials, and small filament tow materials. In using these materials in the production of composite industrial and consumer products, the staple fibers and large filament tow materials are often spun into yarn using complex, multi-step processes that commonly include, for example, the addition of strengthening fibers to the carbon fiber material precursor, or the addition of laminate coatings to fabrics that they are used to prepare.

For staple fibers, relatively short natural or synthetic fibers, the first step in the production of yarn is "carding", in which the fibers are opened and combed over cylinders that contain extremely fine wires or aligned teeth. The fibers are then aligned in one direction to form a large loosely assembled but not twisted continuous strands of fibers known as "sliver". Several strands of sliver are then drawn multiple times onto drawing frames to further align the fibers to improve uniformity as well as to reduce the diameter of the sliver. The drawn sliver is then fed into a roving frame to produce "roving" by further reducing the diameter and imparting a slight false twist. Finally, the roving is fed into a spinning (i.e., winding and/or twisting) frame where it is spun into yarn.

For large filament tow, the first step is different, and consists of a stretch-breaking process in which the large tow is broken into multiple fragments and aligned into sliver. The sliver is then further processed as described above. These processes are laborious, inefficient and costly, require as many as 6 or 8-12 separate steps and often require the use of more than one type of apparatus.

It would be desirable to provide an economical process for converting oxidized PAN materials into yarn using a reduced and minimum number of operations. It would also be desirable to produce an economical process for converting other starting material into yarn using a reduced and minimum number of operations. It would be particularly advantageous to provide a single process that could be used to convert various different materials into yarn. It would be further desirable to provide a process for converting oxidized PAN materials or other starting materials into yarn using a single apparatus. It would be further desirable to provide a process and apparatus for converting multiple materials into yarn simultaneously and in particular to produce a blended yarn by combining the multiple starting materials.

Oxidized PAN materials provide superior fire retardant and heat resistant qualities, i.e., a high LOI and superior Thermal Protective Performance, TPP, but when they are formed according to conventional methods, the strands formed from oxidized PAN carbon fibers are typically brittle, weak and prone to abrasion and cutting. Yarns formed from pure oxidized PAN using conventional methods exhibit undesirably low cut resistance, abrasion resistance and tensile strength and do not include sufficient tensile strength to be knit or woven into fabrics. As such, fabrics made from oxidized PAN carbon fiber strands using conventional methods typically include the fire retardant and heat resistant oxidized PAN strands in combination with one or more high strength or strengthening filaments/fibers. Aramid fiber is an example of such a strengthening filament. The strengthening filaments/fibers in combination with the oxidized PAN produces a fibrous blend having improved tensile strength, cut resistance and durability but the additives, i.e., the strengthening fibers, compromise the flame retarding and heat resisting properties of the fabric.

It would be desirable to produce a yarn and textile and other materials that are composed entirely of oxidized polyacrylonitrile fibers or carbonized polyacrylonitrile fibers yet exhibit sufficient tensile strength to be knittable. It would also be desirable to manufacture an intermediate product that may be used to produce such yarns and textile and other materials. It would also be desirable to combine such an intermediate product to produce blended yarns or textiles.

BRIEF SUMMARY

The inventions described and claimed herein have many attributes and embodiments including, but not limited to, those set forth or described or referenced in this brief summary. The inventions described and claimed herein are not limited to or by the features or embodiments identified in this brief summary, which is included for purposes of illustration only and not restriction.

To address the aforementioned and other needs, and in view of its purposes, the present invention provides, in one aspect, a textile made from a fabric consisting essentially of or consisting of yarn formed of a plurality of fire retardant and heat resistant fibers and no strengthening fibers, each of the fire retardant and heat resistant fibers comprising 100% polyacrylonitrile (PAN). In one embodiment, substantially all of the fibers have an average length greater than about 10 or 15 cm. In another embodiment the fibers have a length within a range of about 2.5 cm to about 23 cm. In another embodiment the PAN fibers may have a length within a range of about 15 cm to about 23 cm. In one embodiment the PAN is oxidized PAN. In another embodiment the PAN is carbonized PAN.

In another aspect, the present invention provides a method for producing one or more cohesive elongated networks of fibers. The method includes providing at least one starting material comprising a tow of filaments forming a ribbon and drawing each of the starting materials through a first pair of rollers and a second downstream pair of rollers of a drafting component, the second pair of rollers having a second rotational speed that is faster than a first rotational speed of the first pair of rollers, thereby stretching and breaking the filaments of the tows of filaments to form at least one cohesive elongated network of fibers formed by stretching and breaking the filaments. In one exemplary embodiment, one cohesive elongated network of fibers is formed from each starting material and in another exemplary embodiment, one blended cohesive elongated network of fibers is formed from the combination of the plurality of starting materials. The cohesive elongated network of fibers is converted into a yarn by twisting and winding the cohesive elongated network of fibers onto a bobbin in a single operation. In one embodiment the starting material is oxidized PAN. In another embodiment the starting material is carbonized PAN. In other exemplary embodiments, the starting material may be aramid fibers such as para-aramid fibers and meta-aramid fibers including Kevlar and Nomex, manufactured by DuPont Company, Lenzing or other suitable materials such as viscose rayon (also referred to as viscose). Other para-aramid materials and other meta-aramid materials may be used as the starting material in other exemplary embodiments. In yet another exemplary embodiment, the starting material may be stainless steel.

In another aspect, the present invention provides a method for producing a fire retardant and heat resistant cohesive elongated network of fibers, the method including providing a starting material comprising a plurality of longitudinally aligned filaments with limited twists, and converting the starting material into the fire retardant and heat resistant cohesive elongated network of fibers in a single operation that stretches and breaks the filaments of the starting material, thereby separating at least some of the filaments into a plurality of the fibers having lengths shorter than the corresponding filaments from which the fibers were separated. The starting material may be oxidized PAN, aramid fibers such as para-aramid fibers and meta-aramid fibers including Kevlar and Nomex manufactured by Dupont Company, Lenzing or other suitable materials such as viscose rayon. Other para-aramid materials and other meta-aramid materials may be used as the starting material in other exemplary embodiments. In yet another exemplary embodiment, the starting material may be stainless steel.

In another aspect, the invention provides a method and apparatus that forms yarn from a plurality of starting materials according to the aforementioned processes. In one exemplary embodiment, different starting materials are fed into the same pair of rollers. The different starting material may each comprise a ribbon of a tow of filaments on a spool on the apparatus. The two or more starting material of ribbons may contact each other as they simultaneously feed through the succession of roller pairs or they may be separated from one another. One or two cohesive elongated networks of fibers may be produced by stretch-breaking the feed material depending on whether the starting materials are in contact with one another when they proceed through the rollers of the drafting section of the apparatus. In one embodiment, a plurality of cohesive elongated networks of fibers are formed, each corresponding to the ribbon starting material and in another exemplary embodiment, a single composite cohesive network of fibers consisting of a blend of the various starting materials, is formed. According to the embodiment in which two or more distinct cohesive elongated networks of fibers are formed, the networks may be blended to form a composite cohesive elongated network of fibers prior to being twisted into yarn. The separate yarns may then later be combined by twisting. The composite cohesive network of fibers may be spun or twisted into a blended yarn in one process step that includes twisting and winding the material onto a bobbin. In other exemplary embodiments, the multiple simultaneously formed cohesive elongated networks of fibers are separately formed into yarns in a single winding and twisting step.

In another aspect, multiple ribbons, each comprising a tow of filaments, are fed into different sets of rollers and are each stretched-broken to form a corresponding cohesive elongated network of fibers as they proceed through subsequent rollers. The cohesive elongated networks of fibers may be combined on the same apparatus to form a composite cohesive network of fibers and blended yarn or they may be maintained separately and separately twisted into respective yarns in a single step which winds and twists the material onto a bobbin.

In another aspect, the present invention provides an apparatus for converting one or more ribbons of tow, each comprising a plurality of longitudinally aligned filaments, into at least one cohesive elongated network of fibers capable of being directly spun into yarn. The apparatus comprises a first pair of substantially conterminous rollers having a first rotational speed and receiving the ribbon of tow therebetween, a second pair of substantially conterminous rollers downstream from the first pair of rollers having a second rotational speed greater than the first rotational speed thereby stretching and breaking the plurality of longitudinally aligned filaments to form the cohesive elongated network of fibers consisting of a collection of randomly oriented fibers formed by breaking the filaments. A pressurizing element applies pressure that urges the first pair of rollers toward each other and the second pair of rollers toward each other.

In another aspect, the present invention provides a composite yarn formed according to the method of providing a plurality of starting materials each comprising a plurality of longitudinally aligned filaments with limited twists, converting each starting material into a corresponding cohesive elongated network of fibers in a single operation that stretches and breaks the filaments of the respective starting materials, thereby separating at least some of the filaments into a plurality of the fibers having lengths shorter than the corresponding filaments from which the fibers were separated. The cohesive elongated networks of fibers are directly blended then spun into yarn in one twisting and winding step.

BRIEF DESCRIPTION OF THE DRAWING

Aspects of the present inventions are also described in light of the accompanying drawings. It is emphasized that, according to common practice, the various features of the drawings are not necessarily to scale. On the contrary, the dimensions of the various features are arbitrarily expanded or reduced for clarity. Like numerals denote like features throughout the specification and drawings.

DETAILED DESCRIPTION

Figure 1:
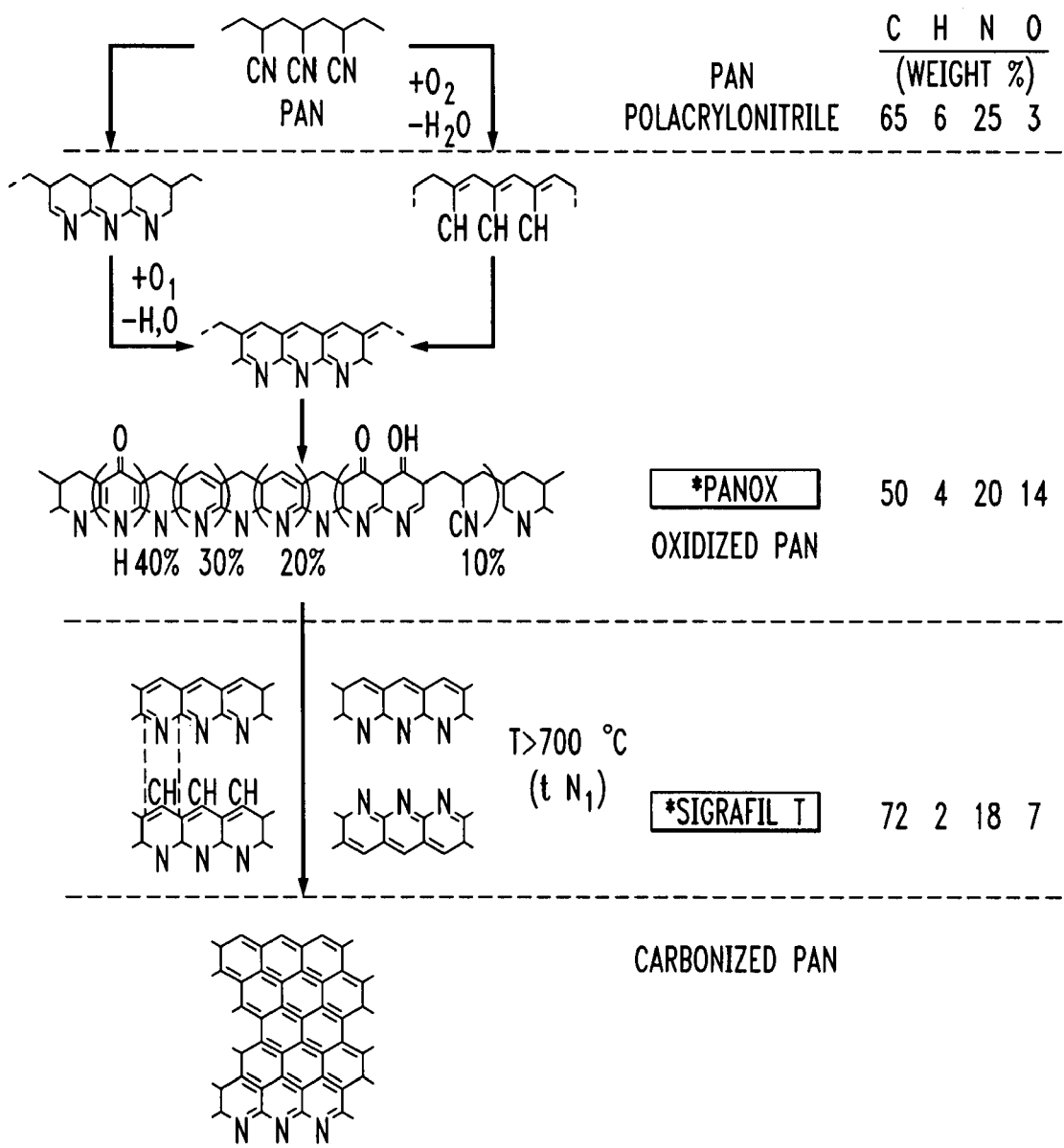
FIG. 1 illustrates the chemical structures of polyacrylonitrile (PAN), oxidized PAN and carbonized PAN.

The invention includes the production of a cohesive elongated network of fibers that can serve as intermediates for the production of goods to impart enhanced performance characteristics such as strength, fire retardance and heat resistance. A cohesive elongated network of fibers intermediate may include a plurality of fibers of one or more types of materials, wherein the fibers are formed from longer filaments and are randomly associated in the network in a wool-like configuration. The cohesive elongated network of fibers is typically a continuous mass and may be directly spun into yarn in one further spinning operation that involves twisting and winding. The invention also relates to the yarn made therefrom. A plurality of cohesive elongated networks of fibers may be formed according to the stretch-breaking method and apparatus of the invention and the cohesive elongated networks of fibers combined and directly spun into a blended yarn in one further twisting/winding operation. Each cohesive elongated network of fibers is formed from one or multiple ribbon-like tow starting materials and the multiple starting materials may be simultaneously stretched-broken to form the cohesive elongated network of fibers by feeding through the same pairs of rollers or through different sets of pairs of rollers. The starting materials may be oxidized PAN, stainless steel or aramid fibers including para-aramid fibers and meta-aramid fibers, viscose rayon and other suitable materials. Alternatively, each of the multiple cohesive elongated networks of fibers may be separately converted into yarns, which may be later combined.

The invention also provides a two-step process for converting tow starting material into yarn in a single apparatus. The invention further relates to an apparatus for feeding and drafting fibers to produce the cohesive elongated network of fibers.

The present invention also provides carbon-based fabrics made from the processes, inventive yarns and intermediates of the invention, as well as goods made therefrom. The goods may be textile fabrics, for example, consisting essentially of yarn formed of a plurality of fire retardant and heat resistant fibers and no strengthening fibers. Each of the fire retardant and heat resistant fibers may be 100% polyacrylonitrile (PAN). The fibers may include an average length greater than about 10 cm, most or all of the fibers having a length within a range of about 2.5 cm to about 23 cm or from about 15-23 cm. In another embodiment, the majority of fibers have an average length greater than about 15 cm. The PAN may be oxidized PAN, carbonized PAN activated PAN, or other suitable materials. In addition to textiles, goods made from the carbon-based fire retardant and heat resistant compositions of the invention, in addition to rovings, yarns, and fabrics, include but are not limited to coverings, upholstery, clothing, insulations, sleeves, ropes, and barriers and masks.

In another embodiment, the yarn may be formed from blends of different starting materials such as a blend of PAN and stainless steel, PAN and viscose rayon, stainless steel and aramid fibers, PAN and aramid fibers, and other suitable combinations. Respective yarns may be combined to form a composite yarn by twisting together.

One or more yarns may be combined by weaving, knitting, or warping to form blended fabrics consisting of multiple yarns. The carbon based fabrics, blended fabrics, and the like may be combined with other fabrics to impart combinations of various desirable features.

In another exemplary embodiment, a fabric made from 100% oxidized PAN yarn may be combined with other fabrics to form a multi-layered fabric. According to one exemplary embodiment, the fabric formed from 100% oxidized PAN may be sandwiched between two other fabrics and in another exemplary embodiment, a composite fabric formed of a layer of 100% oxidized PAN fabric and a further fabric, may be provided. The other fabric may be formed of various aramid materials, stainless steel, viscose rayon, various other dye-able materials or other suitable materials. Each of the fabrics may advantageously be formed of yarn formed according to the methods and using the apparatus, of the present invention.

In addition to textiles, goods made from the various blended yarns, blended fabrics, and layered fabrics include but are not limited to coverings, upholstery, clothing, undergarments, insulations, sleeves, ropes, barriers, masks, protective apparel such as thermal and flash fire protective products, heat and flame insulation, fire safety apparel, firefighter gear such as underwear, balaclavas, socks, boot liners, helmet liners, gloves and glove liners, jackets, pants, hoods, commercial fire safety blankets, military, police and homeland security fabrics, industrial/industrial protection fabrics such as fire blankets and wire/tubing insulation, filtration fabrics used for gas and industrial filtration systems, home furnishings such as fire protective barriers inside furniture and draperies, mattresses, motor sports/automotive/aircraft applications such as hood liners, cockpit lining fabrics, interior auto body thermal protective barriers and seat covers, battery cells, fuel cells, super capacitors and chemical absorption products.

Definitions

The term "filament" refers to a single strand of fibrous material, which may be part of an organized or random collection of filaments. As used in the specification and appended claims, filament refers to a single, continuous or discontinuous elongated strand formed from one or more metals, ceramics, polymers or other materials and that has no discrete sub-structures (such as individual fibers that make up a "thread"). Filaments can be formed by extrusion, molding, melt-spinning, film cutting, or other known filament-forming processes. A "filament" differs from a "thread" in that a filament is, in essence, one continuous strand rather than a plurality of fibers or strands that have been carded or otherwise joined together to form a thread. "Filaments" are characterized as strands that are long and continuous, and may be as long as the entire length of yarn (i.e., a monofilament).

The terms "fiber" and "fibers", as used in the specification and appended claims, refer to any slender, elongated structure that can be carded or otherwise formed into a thread. Fibers may be truncated filaments and may be formed by the separation of filaments into shorter components. Fibers are therefore characterized as being shorter than the filaments from which they may be formed. Examples include "staple fibers", a term that is well-known in the textile art. The term "fiber" differs from the term "filament", which is defined separately above.

The term "thread", as used in the specification and appended claims, refers to continuous or discontinuous elongated strands formed by carding or otherwise joining together one or more different kinds of fibers. The term "thread" differs from the term "filament", which is defined separately herein.

The term "yarn", as used in the specification and appended claims, refers to an assemblage of strands. "Threads" and "filaments" are both examples of "strands" which is used rather generally as an elongated fibrous member. Yarn has a virtually continuous length that is suitable for use in knitting and/or weaving, either alone or with other filaments or yarns, into textile materials. "Blended yarn" is a yarn made from multiple separate components that are blended together. A "composite yarn" is a composite yarn formed by twisting and/or spinning together a plurality of previously formed yarns.

The term "cohesive elongated network of fibers" refers to a continuous mass of a randomly arranged collection of untwisted fibers that are held together by mechanical, physical and noncovalent chemical forces.

The term "wool-like" refers to a filament or fiber network in which the random collection of untwisted filaments or fibers includes individual filaments or fibers that are partially or completely crinkled, curled, crimped, wavy and/or otherwise curved.

The term "fabric", as used in the specification and appended claims, refers to an artifact made by weaving, felting, knitting, warping, crocheting or otherwise assembling one or more different types of yarns into a desired layer.

The term "limited twist", as used in the specification and appended claims, refers to filaments or fibers having a twist number less than 50 per meter.

The term "PAN" refers polyacrylonitrile. See FIG. 1. The term "oxidized PAN" refers to polyacrylonitrile fiber which has been oxidatively stabilized. See FIG. 1. Oxidized PAN can also be further processed to form carbonized PAN. See FIG. 1.

The term "carbon fiber" refers to a fiber containing at least about 90% carbon, which is usually obtained by the controlled pyrolysis of appropriate fibers.

The term "tow" refers to a collection of untwisted continuous filaments and is often referred to in terms of the number of filaments in the collection, such as 3K, 6K, etc. "Small filament tow" may generally describe tow having about 24K filaments or less.

The term "LOI" refers to the limiting oxygen index, which is a measure of the percentage of oxygen that has to be present to support combustion of a material. The higher the LOI, the lower the flammability.

The meaning of other terminology used herein should be easily understood by someone of ordinary skill in the art.

The present invention provides a simple, efficient and cost-effective method to draft various filamentous starting materials into wool-like fiber networks. A typical filamentous starting material has straight, long filaments with very limited inter- and intra-filament twisting. The filaments of the starting material may be well organized and aligned longitudinally (i.e., they are generally parallel to one another) and may come in the form a of a ribbon or in other forms. Exemplary filamentous starting materials include, without limitation, PAN, oxidized PAN, polyester materials, aramid materials, including para-aramid materials and meta-aramid materials nylon materials, viscose rayon and metal materials such as stainless steel, nickel, and various alloy materials. In various exemplary embodiments, the starting materials may represent a filamentous starting material or fibers.

Typical starting or precursor materials are filament tows consisting of untwisted parallel filaments of a uniform length equal to the length of the tow. Preferably, these precursor tows may have a twist number less than 50 per meter ("limited twist") and each filament has a length of no less than 2 meters. More preferably, the precursors may include a twist number less than 25 per meter. Yet more preferably, the precursors may have a twist number less than 10 per meter, or less than 5 per meter. For polymeric filaments, each filament may advantageously have a decitex (1 g/10,000 meters) of no greater than 67 and the total measure of the tow is no greater than 32,000 decitex. For stainless steel, each filament may advantageously have a decitex of no greater than 550 and the total measure of the tow may be no more than 260,000 decitex.

In one embodiment, the starting material may be oxidized PAN tow with no greater than 192K filaments and a filament diameter of no greater than about 50 micrometers but other sizes of tow and other filament diameters may be used in other exemplary embodiments. Preferably, the oxidized PAN has a tow of no greater than about 96K, and a filament diameter of no greater than about 25 micrometers. More preferably, the oxidized PAN has a tow of no greater than about 48K. Yet more preferably, the oxidized PAN has a tow of no greater than about 24K and may include a tow of about 3K to about 12K. Oxidized PAN tow is commercially available from a number of different companies, such as Asahi Chemical Industry Co., Ltd. at Osaka, Japan (LASTAN®), Zoltek at St. Louis, Mo. (PYRON®), SGL Carbon AG at Wiesbaden, Germany (PANOX®), Dow Chemical Company at Midland, Mich. (CURLON®), and a small filament tow supplied by J.D. Seal and Gasket Company of China. However, the present invention is not limited by the source of oxidized PAN tow. In addition, many publications are available with sufficient information to allow one to manufacture oxidized PAN tow with desired structures and properties.

The present invention is also not limited by the chemical composition of oxidized PAN, which is a function of the composition of the PAN precursor, and the oxidative stabilization process to convert PAN into oxidized PAN. The PAN precursor can be, for example, a homopolymer of acrylonitrile, acrylonitrile based copolymers, and acrylonitrile based terpolymers. The copolymers may preferably contain at least about 85% (by mole) of acrylonitrile monomers and up to about 15% (by mole) of one or more mono-vinyl units. Exemplary other vinyl monomers that are able to copolymerized with acrylonitrile include methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid and salts thereof; vinylsulfonic acid and the salt thereof.

Oxidized PAN (see FIG. 1) that is useful in the practice of the present invention can be produced from various PAN materials using well established oxidative pyrolytic processes. Oxidative stabilization may be performed at atmospheric pressure in the presence of oxygen at a temperature of about 200-300° C. The chemical composition of oxidized PAN is affected by the duration of time and the temperature of the oxidation process. In one aspect, the oxidized PAN used in the practice of the present invention may have a density of about 1.30 to about 1.50 g/cm$^3$, a carbon content of about 55 to about 68%, and an "LOI" (Limiting Oxygen Index) value of about 40 to about 60%. In another embodiment, the starting material may be carbonized PAN (see FIG. 1) which is oxidized PAN that has been further processed through a carbonization and graphitization processes as described below. In still another embodiment, the starting material may be activated PAN as described below.

In another embodiment, the starting material may be polyester with a tow of no greater than 192K and a filament diameter of no greater than 50 micrometers although other diameters and numbers of filaments may be used in other exemplary embodiments. The tow of polyester filaments may advantageously have no greater than 96K filaments and the filament diameter may be no greater than 25 micrometers. More preferably, the polyester tow may be a tow of no greater than 48K. Yet more preferably, the polyester tow may have no greater than 24K filaments. Yet more preferably, the polyester tow may have no greater than 12K filaments.

in yet another embodiment, the starting material may be stainless steel with a tow Of no greater than 192and a filament diameter of no greater than 50 micrometers. Preferably, The precursor filamentous material has a tow of about no greater than 96k filaments, the Filaments having diameters no greater than 48k. yet more preferably, the stainless steel material has a Tow of no greater than 24k. yet more preferably, the stainless steel tow is a tow of no greater than 12k.

In yet another embodiment, the starting material is an aramid material with a tow of no greater than 192K and a filament diameter of no greater than 50 micrometers. The aramid material may be a para- or meta-aramid material. The precursor may advantageously have a tow of no greater than 96K with filaments having diameters no greater than 20 micrometers. More preferably, the filamentous aramid starting material has a tow of no greater than 48K. Yet more preferably, the aramid material may have a tow of no greater than 24K. Yet more preferably, the aramid material may have a tow of no greater than 12K. An aramid material is an aromatic polyamide and comes with many different grades and properties for various applications. The aramid fiber has excellent environmental and thermal stability, static and dynamic fatigue resistance, and impact resistance. Aramid filaments have the highest specific tensile strength of any commercially available continuous filament tow. Examples of aramid materials include, but are not limited to, KEVLAR-.RTM. by DuPont (Greenville, Del.), TWARON.RTM. and TECHNORA.RTM., TEIJINCONEX.RTM. by Teijin (Arnhem, Netherlands) and Nomex.RTM.

In another exemplary embodiment, the starting material may be viscose rayon. Viscose is a viscous organic liquid used to make viscous rayon and cellophane. Cellulose from wood or cotton fibers is treated with sodium hydroxide, then mixed with carbon disulfide to form cellulose xanthate, which is dissolved in more sodium hydroxide. The resulting viscose is extruded into an acid bath either through a slit to make cellophane or through a spinnerette to make viscose rayon, commonly referred to as viscose.

The methods and apparatuses of the present invention can be used to draft two or more strands of fibers simultaneously. When the fibers drafted are of different types, a blended or composite cohesive elongated network of fibers is obtained. The blended fibers may include PAN and viscose rayon, PAN and stainless steel, PAN and an aramid material, stainless steel and an aramid material, and other suitable combinations. Other fibers that may be used include linear fibers that may be selected from natural or synthetic fibers. Exemplary fibers include carbon fibers, ceramic fibers, glass fibers, metal fibers, carbonaceous fibers (e.g. cotton, wool, polyester, polyolefin, nylon, viscose rayon or novoloid phenolic), inorganic fibers (e.g. silica, silica alumina, potassium titanate, silicon carbide, silicon nitride, boron nitride, and boron), acrylic fibers, tetrafluoroethylene fibers, polyamide fibers, vinyl fibers, protein fibers, and oxide fibers derived from boron, thoria or zirconia.

Processing/Apparatus

In one aspect of the present invention, the apparatus of the present invention comprises feeding and drafting components and a spinning component. The feeding process involves feeding a continuous precursor of filamentous material into the drafting mechanism. The feeding process is passive and advantageously maintains the fiber in a flat configuration, with minimum twist, i.e. no more than double the twist of the starting material.

The feeding component may be a conventional "ring spinning frame". However, other conventional feeding components and methods may also be appropriate. Furthermore, the feeding component may comprise two or more feeding elements so that two or more strands of fibrous or filamentous starting materials may be drafted simultaneously. When the fibrous or filamentous starting materials fed into the drafting component are of different types, a blended fibrous network is produced.

Figure 2:
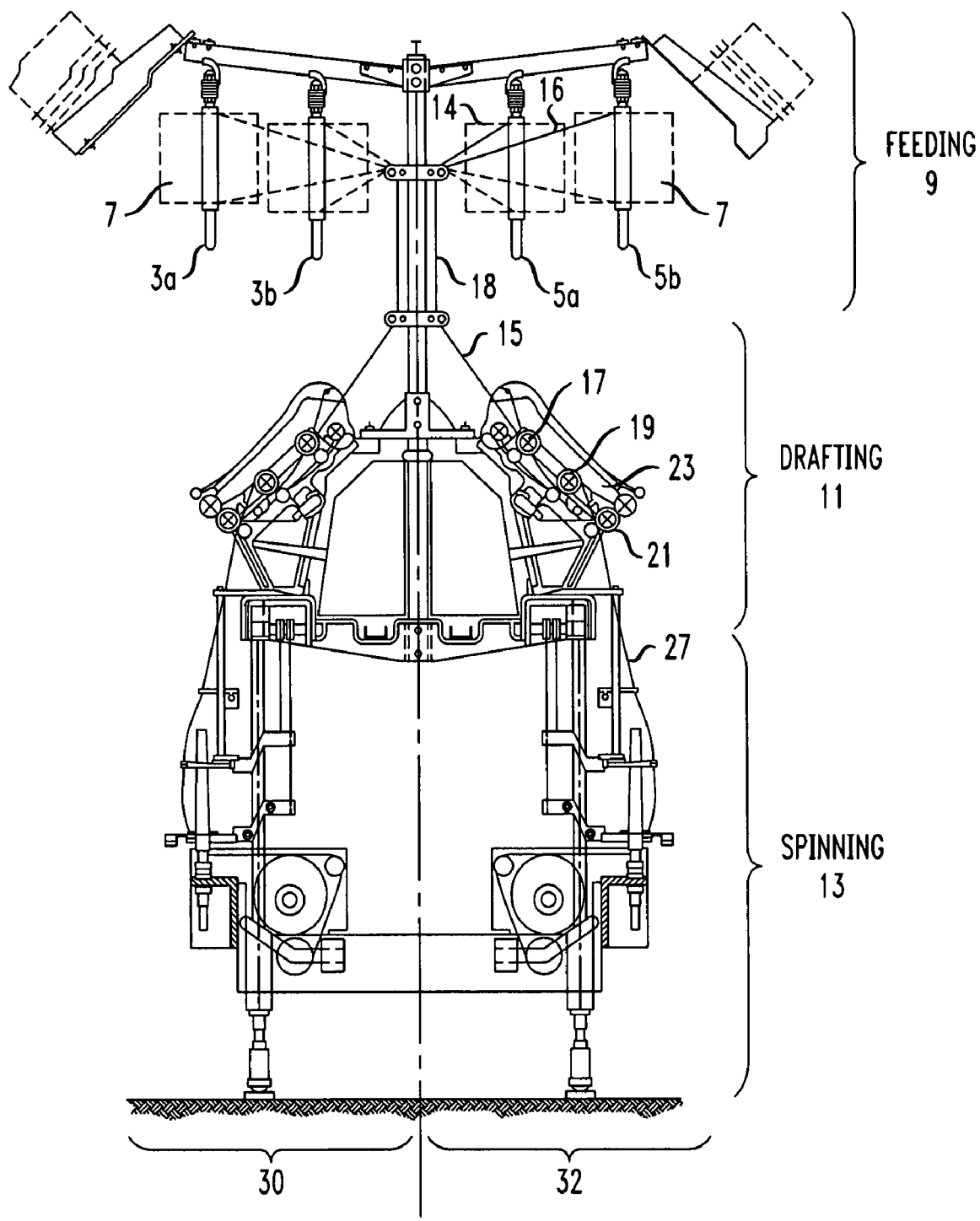
FIG. 2 illustrates one embodiment of an apparatus used to carry out a method of the invention.

FIG. 2 illustrates one apparatus having feeding component 9, drafting component 11 and spinning component 13. The illustrated exemplary apparatus is a dual-mode, i.e. side-by-side apparatus that is capable of forming two yarns, one on the left hand side 30 and one on the right hand side 32 in the illustrated embodiment. Feeding component 9 has four rollers or posts in the illustrated embodiment: 3a, 3b, 5a and 5b. Starting material 7 is placed on each of rollers 3a, 3b, 5a and 5b. The starting material 7 on the different rollers may be the same or different, e.g., starting materials 14 and 16 may be different. According to this exemplary embodiment portion 18 of feed material 15 may actually represent two feed materials directed to drafting component 11. According to this exemplary embodiment, intermediate product 27 may include multiple cohesive elongated networks of fibers, each associated with a starting material. Intermediate product 27 may alternatively represent the blending of multiple cohesive elongated networks of fibers to form a single cohesive elongated network of fibers. It should also be understood that the apparatus shown in FIG. 2 is exemplary only and in other exemplary embodiments, there may be more rollers on either left hand side 30 or right hand side 32, each supplying at least one starting material to drafting component 11.

Figure 3A:
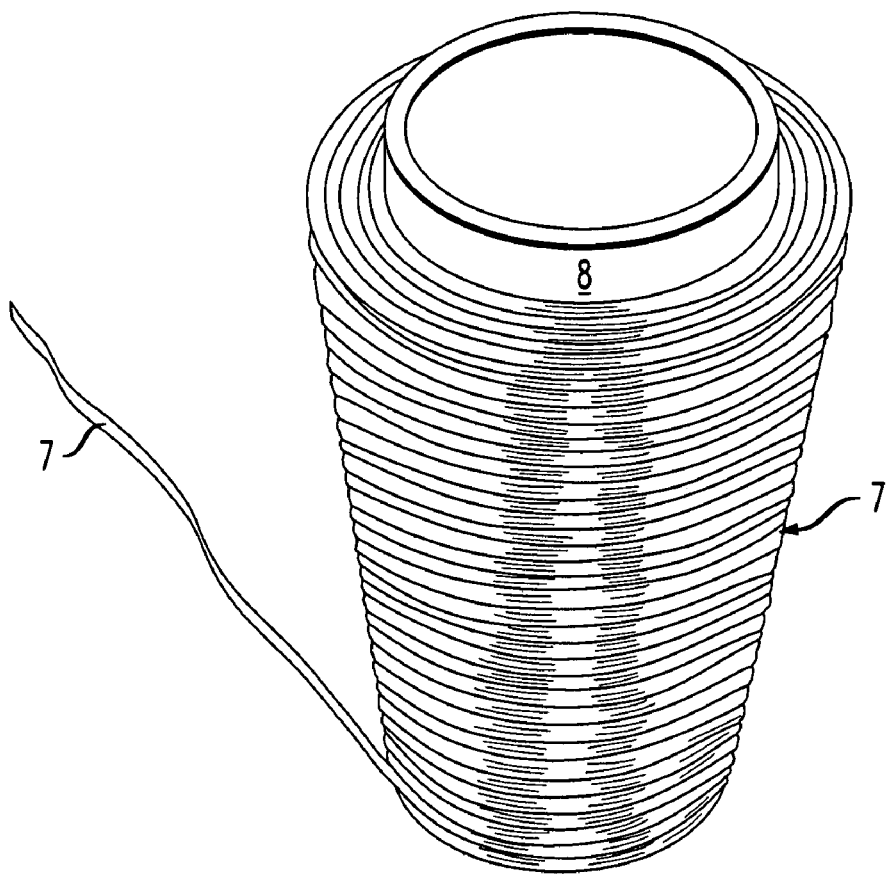
FIG. 3A illustrates a spool of small filament tow oxidized PAN, one embodiment of a starting material that may be used according to the invention

In one embodiment, starting material 7 may be small filament tow in ribbon form such as shown in FIG. 3A. The small filament tow starting material 7 may be disposed on spool 8, may consist of untwisted small filament tow consisting of 3K, 6K, 12K or 24K filaments and may advantageously be oxidized PAN. Starting material 7 may be any of the aforementioned material useable as starting materials.

Figure 3B:
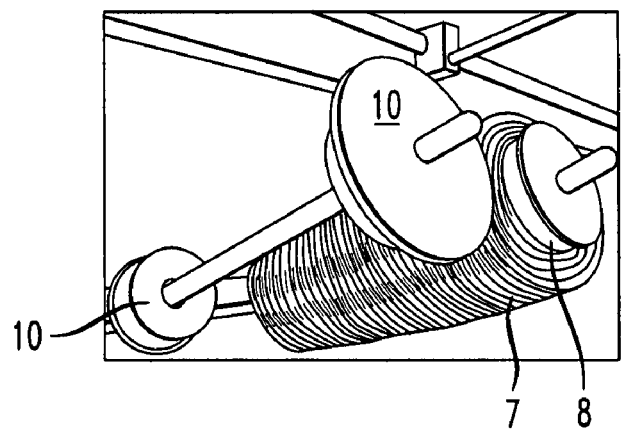
FIG. 3B illustrates an exemplary tension disk upon which the starting material may be provided.

Referring to FIGS. 2 and 3A and 3B, within feeding component 9, starting material 7 is unwound from the respective roller 3a, 3b, 5a or 5b and fed as feed material 15 to drafting component 11. According to one embodiment, feed material 15 may be untwisted small filament tow consisting of 3K, 6K, 12K or 24K filaments. In one embodiment, starting material 7 and the small filament tow feed material 15 may be oxidized polyacrylonitrile (PAN). According to some exemplary embodiments, rollers 3a, 3b, 5a and 5b may include tension disks (see FIG. 3B) that maintain tension on feed material 15 and enable feed material 15 to be delivered to drafting component 11 in a flat and untwisted manner. Various suitable tension settings may be used. In one exemplary embodiment, the tension and feeding component may enable the feed material to be maintained essentially flat and untwisted for a length of up to about 30 meters between the rollers 3a, 3b, 5a or 5b and drafting component 11. Various arrangements may be used for unwinding starting material 7 from spools 8 in various directions and orientations. FIG. 3B shows an exemplary starting material 7 on spool 8 mounted on tension disk 10 of feeding component 9. Further details of starting material 7/feed material 15 will be shown in FIG. 8A.

Figure 4:
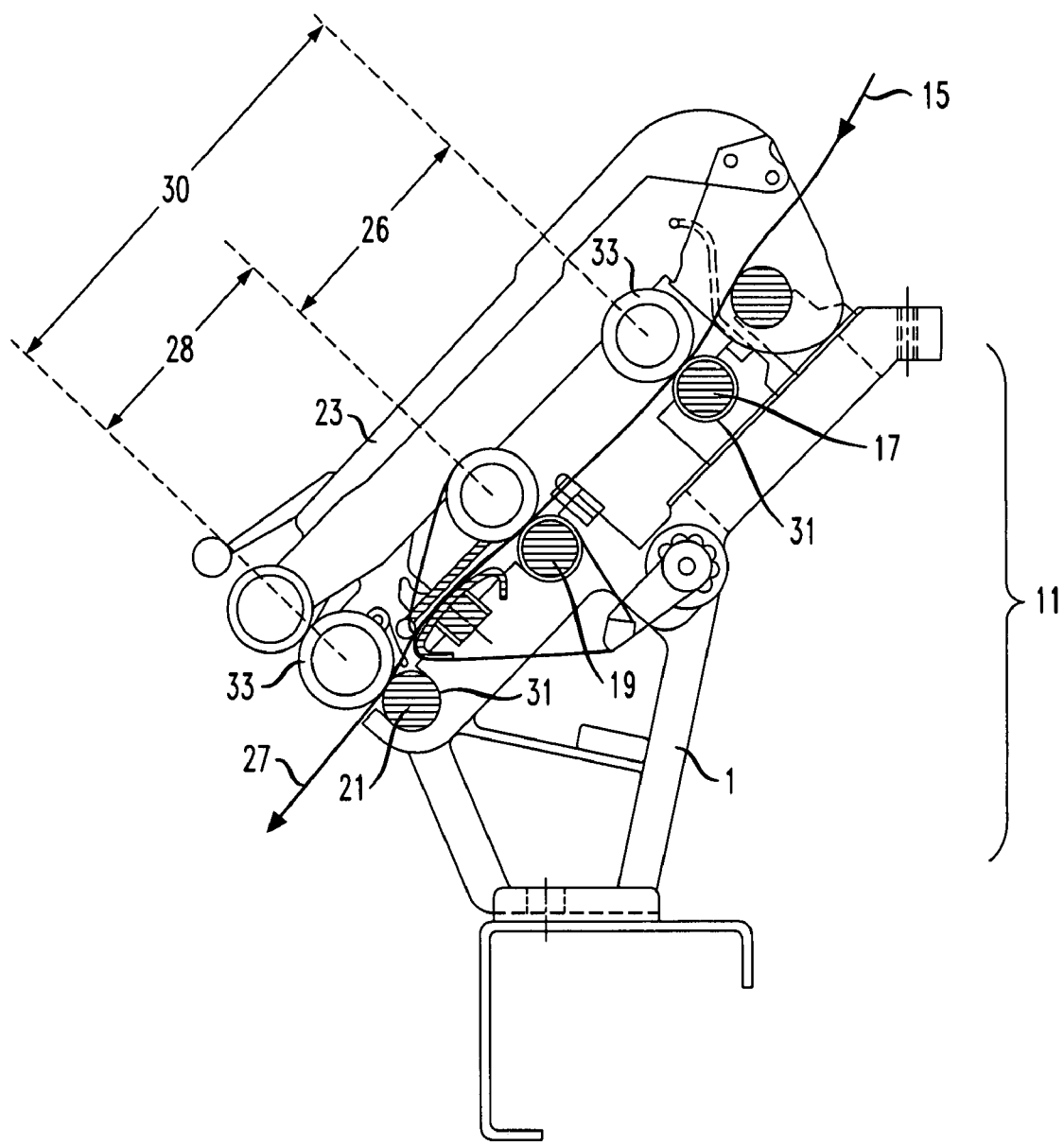
FIG. 4 is an expanded, cross sectional view of the drafting component of the apparatus shown in FIG. 2.
Figure 5:
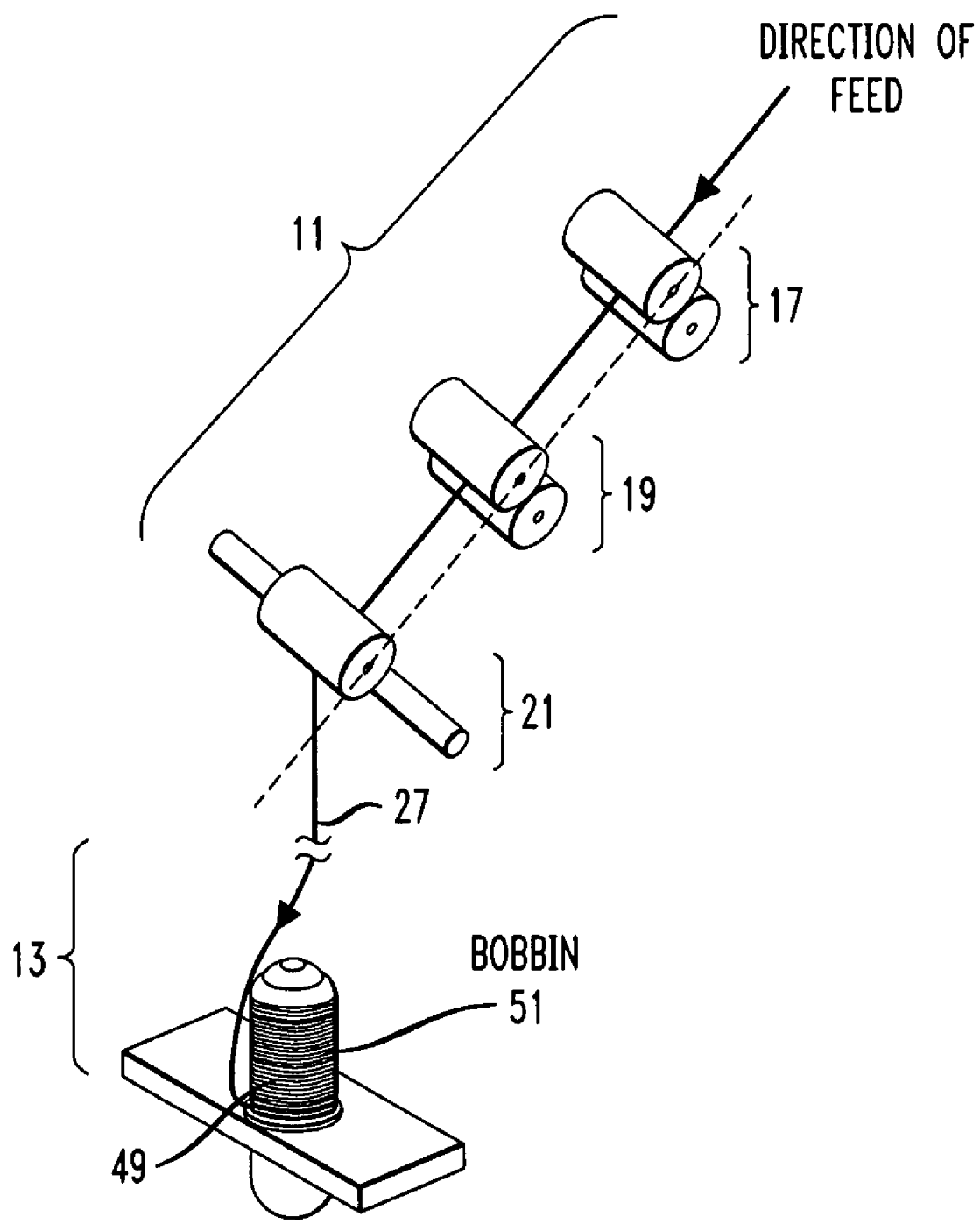
FIG. 5 depicts the feeding, drafting, twisting and winding components of the apparatus shown in FIG. 2.

FIGS. 2, 4 and 5 together illustrate an embodiment in which a single feed material 15 enters pairs of rollers and is stretch-broken and formed into a cohesive elongated network of fibers. For clarity, the following description generally describes the process and apparatus for a single feed material 15 but it should be understood that the following description also applies to the embodiments in which a plurality of feed material 15, different or the same, are fed into various arrangements of pairs of rollers. These particular embodiments will be discussed after the following description of a single feed material 15.

Feed material 15 enters drafting component 11 and is fed through a system of pairs of rollers including first roller pair 17, second roller pair 19 and third roller pair 21. The tension applied to feed material 15 advantageously maintains feed material 15 untwisted and flat such that it enters drafting component 11 such that the plane of feed material 15 is parallel to the plane formed by the tangent to the rollers, i.e., the opposed sides of the ribbon of tow may be flush against each of the pair of rollers in exemplary embodiments. Pendulum carrier 23 includes a pendulum and applies pressure urging each of roller pairs 17, 19 and 21 toward each other. In an exemplary embodiment, the opposed surfaces of each of the rollers of a pair of rollers, are conterminous so that the material passing between the pair of rollers is firmly gripped by the pair of rollers. A more detailed depiction of drafting component 11 is provided in FIG. 4. In another exemplary embodiment, drafting component 11 may consist of only two pairs of rollers. The apparatus illustrated in FIG. 2 is intended to be exemplary only and in other embodiments, more of fewer feeding components, each with at least two pairs of rollers, may be included.

The drafting process that takes place in drafting component 11 stretches and breaks some or all of the longitudinally-aligned filaments of the ribbon-like small filament tow feed material 15 and in one drafting operation, converts the ribbon-like small filament tow feed material 15 to a cohesive elongated network of fibers consisting of a plurality fibers produced by separating the long incoming filaments into a plurality of shortened fibers as each successive pair of downstream rollers rotates, i.e., turns or spins at a faster rotational speed than the immediately upstream pair of rollers thus pulling, stretching and breaking the filaments of the tow starting material. The produced fibers may have lengths ranging from about 2-9 inches in one embodiment but other ranges of lengths may be obtained ion other exemplary embodiments. In one exemplary embodiment, the average fiber length may be greater than 15 centimeters. In another exemplary embodiment, the average fiber length may be greater than 10 cm. In one exemplary embodiment, most or all of the fibers may include a length of greater than 15 centimeters. The average and minimum length and range of fiber lengths is determined by the draft ratio between the rollers and the size of the tow and filament diameter of feed material 15. The term "draft ratio" refers to the ratio of the speed of one pair of rollers to the speed of the preceding pair of rollers of a drafting component. In an advantageous embodiment, the rollers of each pair of rollers may be arranged such that the axes of the rollers (shown as the intersections of the "X's" in FIG. 4), are parallel to each other. This parallel alignment is also depicted in FIG. 5 by the dashed line between rollers. In one embodiment, the axes of each pair of rollers, e.g., first roller pair 17, may also be parallel to each other as depicted by the dotted line between third roller pair 21 shown in FIG. 5.

During the drafting process, each roller of a pair applies an equal and opposite pressure onto opposing sides of feed material 15 so that feed material 15 can only be moved by the rotation of the rollers and does not slip away from the rollers. Each of the pairs of rollers 17, 19 and 21 may advantageously be conterminous or substantially conterminous at their contact points. Stated alternatively, in one exemplary embodiment, the rollers may be conterminous at a contact point and in another exemplary embodiment they may be substantially conterminous, i.e., in close proximity and separated by a small distance equal to or less that the dimension of feed material 15 or contacting in areas except where feed material 15 passes therebetween. The pressure or other force applied onto each pair of rollers may be accomplished by various suitable conventional methods and may be applied either independently, i.e., separately, or cooperatively as in the illustrated embodiment. In one exemplary embodiment, a weight element may be used to exert appropriate pressure onto the rollers. The pressure can be generated by applying the weight element onto at least one of the rollers of each pair. In the illustrated embodiment, and to simplify the design of the apparatus of the present invention, the weight element is applied to only one of the two rollers of each pair but in other exemplary embodiments, other configurations may be used.

In the illustrated embodiment, such as shown in FIGS. 2 and 4, a single weight element—pendulum carrier 23 cooperatively exerts appropriate pressure onto one roller of each pair of rollers 17, 19 and 21 so that the rollers of the roller pair are urged toward each other and the tow material is moved by the rotation of the mechanically-driven rollers. In one embodiment such as illustrated in FIG. 2, one roller from the first 17 and second pairs of rollers is attached to pendulum carrier 23. The third pair of rollers 21 is attached to the frame 1 of the apparatus. This arrangement is exemplary only and other arrangements may be used in other exemplary embodiments. The pressure is adjustable by adjusting the weight of pendulum carrier 23 and by varying the relative position of a pendulum or other members on pendulum carrier 23, and the rollers. The pendulum carrier is preferably detachable from the drafting component 11 or may swing open on a hinge for easy access to the rollers. Mechanical rotation of the rollers may be accomplished by any suitable and conventional manual or automatic method.

The rollers can be made from a variety of materials including, but without limitation, rubber, metal such as steel and aluminum, wood, polymer resins and composite material such as fiberglass. Rollers attached to the frame 1 of the apparatus may include an uneven surface 31 or "teeth," i.e., any uneven surface of any configuration including ridges, striations, individual protrusions, etc., and may be driven mechanically. As such, at least one of the rollers may be metal in an exemplary embodiment. According to the embodiment in which the surface 31 of the roller includes teeth, the teeth can have several different configurations such as the alignment of teeth being parallel to the axis of the roller or forming an angle relative to the axis of the roller. The teeth may be evenly distributed on surface 31 of the roller for consistency of the quality of the filament network produced. The rollers attached to pendulum carrier 23 (one roller from each of first 17 and second pair 19) may be mechanically driven or may be slave rollers which are driven by the corresponding roller attached to the frame 1 of the apparatus. Some rollers such as the rollers attached to pendulum carrier 23 may include outside coverings or cots 33 formed of materials such as rubbers, plastics, polymers, natural polymers, cotton, ceramics, metals and alloys. In one embodiment, cot 33 may be rubber and include a hardness of about 50 to 90 or about 65-90 according to the Shore A hardness scale. In one embodiment, the rubber cot may include a hardness of about 75 according to the Shore A hardness scale.

Referring to FIG. 4, distance 26 between first pair of rollers 17 and second pair of rollers 19 may be about 105 mm in one embodiment but may range from about 50 to about 200 mm in other exemplary embodiments. Distance 28 between third pair of rollers 21 and second pair of rollers 19 may be about 135 mm in one exemplary embodiment but may range from about 50 to about 200 mm in other exemplary embodiments. Distance 30 between first pair of rollers 17 and third pair of rollers 21 may be about 240 mm in one embodiment and about 180 mm in another embodiment but may be about 150 mm or greater in other exemplary embodiments.

In another embodiment, drafting component 11 may have three or more pairs of rollers through which one or multiple feed materials 15 are fed. In one aspect, the drafting component has no greater than ten pairs of rollers through which one or multiple feed materials are fed. In another aspect, the drafting component may have three to six pairs of rollers. In one particular embodiment, the drafting component has two pairs of rollers through which one or multiple feed materials 15 are fed. In other exemplary embodiments, one or more different feed materials 15 are fed through two, three or more separate pairs of rollers and are combined thereafter. As depicted in FIGS. 2, 4, and 5, the arrangement of rollers is such that the feed material 15 first contacts first roller pair 17, then passes through the second roller pair 19, and comes out of third roller pair 21 as a stretched material or a frayed ribbon (see FIGS. 8A-8C) for further drafting or as a fluffy fibrous network intermediate formed by stretch-breaking. The three pairs of rollers can have a variety of arrangements within the drafting component. One arrangement for the three pairs of rollers is illustrated in FIG. 5. Similar to the other two pairs, the rollers of the second roller pair 19 are so arranged that their axes are parallel to each other. Optionally, the axes of the second rollers may also be parallel to one of the other two roller pairs or both. Similar to the drafting component described above, one roller from each roller pair 17, 19, 21 may be attached to pendulum carrier 23 with the other roller of each roller pair 17, 19, 21 attached to the frame 1 of the apparatus. Second roller pair 19 may be removable from the apparatus so that the drafting component can easily be transformed into a drafting component with two pairs of rollers as described above and vice verse. The pressure exerted onto each pair of rollers is adjusted by the weight of pendulum carrier 23 and by varying the relative position of pendulums on the pendulum carrier 23 with respect to the rollers. The three rollers attached to the apparatus may be metal rollers with teeth and driven mechanically whereas the other three are slave rollers and driven by its counterpart. The teeth on the surface of the roller can have several different arrangements as described above. The three rollers on the pendulum carrier may advantageously include cots 33 as described above.

Essentially, drafting component 11 stretches and/or breaks and randomizes the long filaments of the ribbon-like small filament tow incoming material to form a wool-like network from each respective feed material 15, i.e., a cohesive and continuous fibrous network formed of a plurality of wavy fibers formed when the longer filaments of the corresponding feed material are stretched and broken and separated into the smaller fibers. Alternatively, in another exemplary embodiment, the cohesive and continuous fibrous network formed of a plurality of wavy fibers may be formed from a plurality of feed materials and may represent a blended fibrous network.

Drafting is accomplished by a stretching force created due to the difference in speed between pairs of rollers, wherein at least one downstream pair of rollers operates at a greater speed than the closest upstream pair of rollers. The draft ratio may range from about 1.1 to about 50 in various embodiments but other draft ratios may be used alternatively. In an exemplary embodiment, the draft ratio may lie within a range of about 6 to 29. The pressure urging the rollers together is adjusted according to the type of feed fiber and the drafting ratio. The pressure on the rollers can be same or different and may be accomplished using different pendulum weights. By varying the speed difference and the pressure exerted by the pendulum, the apparatus is able to process different fibers with various tows, and produce cohesive fibrous networks with various characteristics, such as different average fiber lengths and diameters, from a particular feed material, e.g., a plurality of longitudinally aligned filaments may be collectively separated into a fiber consisting of more than one filament. In this manner, when more than one feed material is simultaneously fed through rollers such as rollers 17, 19, and 23, the different starting materials may each be stretch broken to produce corresponding cohesive fibrous networks with different characteristics. These cohesive fibrous networks may be combined, as will be shown.

Typically, the rotational speed of the downstream pair of rollers is slightly faster than that of the preceding pair of rollers so that a small force is exerted on the feed material. This force may be used to straighten the filamentous material being drafted, for effective drafting. Sometimes, the incorporation of the second rollers also enhances the stability of the drafting component for sustainable and continuous operation. Drafting is accomplished by a stretching force created due to the difference in speed between the last and immediately upstream pairs of rollers. According to the embodiment using three pairs of rollers, the second pair of rollers 19 rotates slower than the third pair of rollers 21 under appropriate pressure to prevent slipping. However, the overall draft ratio is calculated based on the ratio of the speed of the last rollers versus the speed of the first rollers. The pressure on each pair of rollers can be adjusted according to the type of feeding fiber and the drafting ratio. In the present invention, this is accomplished using different weight of pendulums and relative position of pendulums to the rollers. By varying the speed difference and the pressure exerted by the pendulum, the apparatus is able to process different fibers with various tows as well as two or more fibers, of the same kinds or different types, simultaneously. In one exemplary embodiment, the stretching is accomplished by a draft ratio between first roller pair 17 and second roller pair 19 to produce a stretched material or a frayed ribbon (see FIGS. 8A-8C) which is as described below as intermediate product 27 and is maintained generally flat by passing between third roller pair 21 prior to being spun and twisted in spinning component 13.

In another aspect of the present invention, the apparatus further comprises spinning component 13 as depicted in FIGS. 2, 4 and 5. After the drafting procedure in drafting component 11, intermediate product 27 exits the drafting component 11 and is directed to spinning component 13. Intermediate product 27 is shown in detail in FIGS. 8B and 8C. Using optional spinning component 13, intermediate product 27 may be directly spun into yarn 49 on bobbin 51 in one simple spinning operation that winds and twists intermediate product 27 onto bobbin 51. By incorporating spinning component 13, the filament network may be directly processed into fine yarn with a yarn count of 1 to 60 Nm on the same apparatus and in one further operation. Yarns with other yarn counts may be produced in other exemplary embodiments. The unit, "Nm", is a measure of the thickness of yarn in term of the length in meters for one gram of yarn. For instance, if one gram of yarn is 20 meters in length, then the yarn count is 20 Nm. Therefore, the higher the Nm, the thinner the yarns. In one aspect, the generally flat intermediate product 27 is spun and twisted into yarn 49 which is generally round in one simple spinning and twisting operation. In one aspect, a small tow of oxidized PAN filaments of various tow sizes can be formed into a cohesive elongated network of oxidized PAN fibers which are then wound and twisted into yarns with about 10 to 28 Nm. In one embodiment, the yarn is formed of 100% oxidized PAN fibers having length characteristics as described in conjunction with the intermediate product 27 as described herein. The process of the present invention can produce very thin yarn in a simple, efficient and economical process.

Figure 6A:
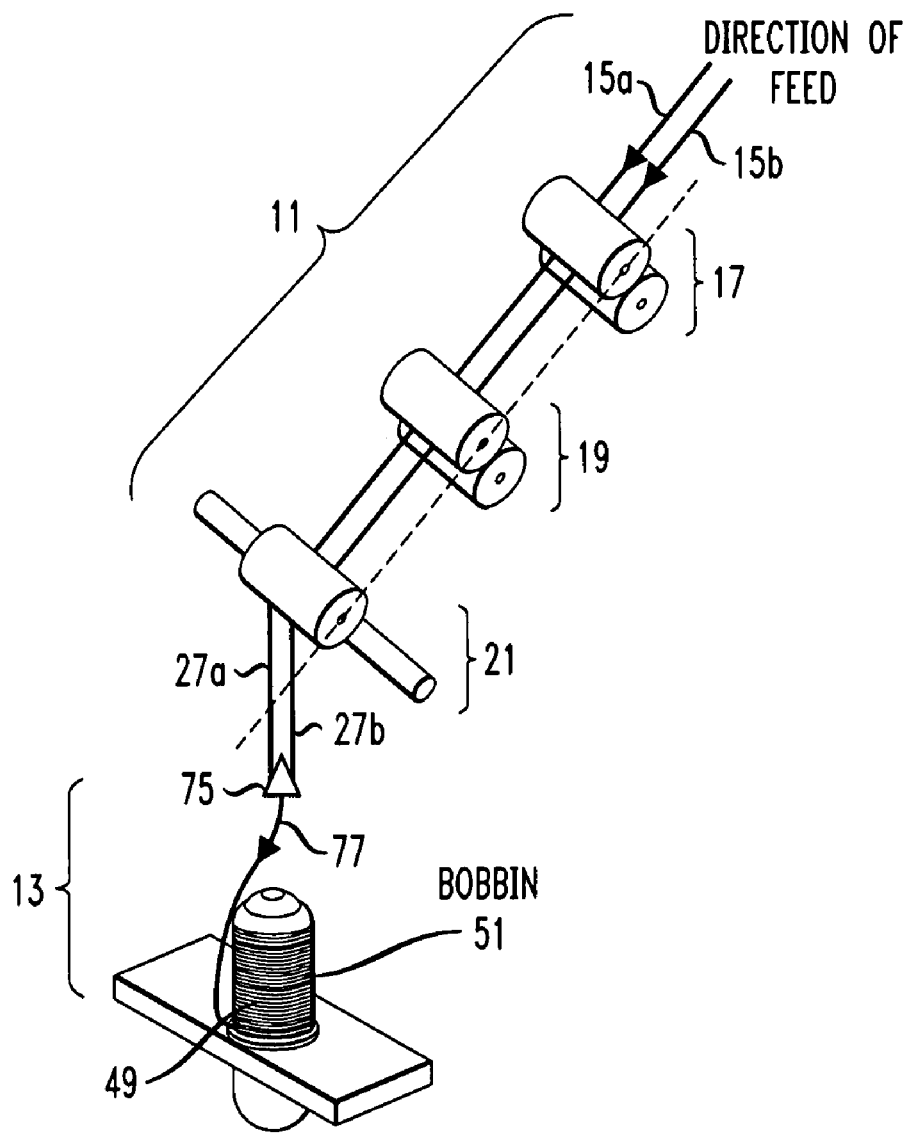
FIG. 6A depicts the feeding, drafting, twisting, combining and winding components used to stretch-break and blend two feed materials

FIG. 6A shows an arrangement similar to that shown in FIG. 5 but in which drafting component 11 accommodates two feed materials 15a and 15b. Feed materials 15a and 15b are as described for feed material 15. Feed material 15a, 15b are each drawn through pairs of rollers 17, 19, and 21 and each produce an associated intermediate product 27a, 27b. Intermediate products 27a, 27b are blended by combiner 75 to form intermediate product 77 which is a blended cohesive elongated network of fibers and which is twisted and wound onto bobbin 51 to form yarn 49. Combiner 75 is a conventional member/structure to combine two fiber blends. In FIG. 6A, it can be seen that the materials 15a, 15b are laterally disposed and separated as they successively pass through rollers 17, 19, and 21 simultaneously.

Figure 6B:
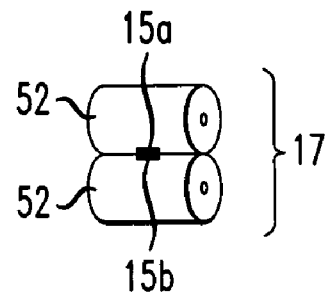
FIG. 6B illustrates an embodiment in which multiple starting materials proceed between rollers and are stretch-broken simultaneously.

FIG. 6B shows another exemplary embodiment in which feed materials 15a and 15b pass through first pair of rollers 17 in contact with each other. Starting material 15a, 15b are stacked over one another as they pass through rollers 52 of first pair of rollers 17 and according to this exemplary embodiment, may advantageously form a single intermediate product 27 which represents a blended intermediate product consisting of starting materials from feed material 15a and 15b. Intermediate product 27 is described below. According to this exemplary embodiment, intermediate product 27 consisting of a blend of two starting materials, is then twisted and wound onto a bobbin in one step, to produce yarn.

Figure 7:
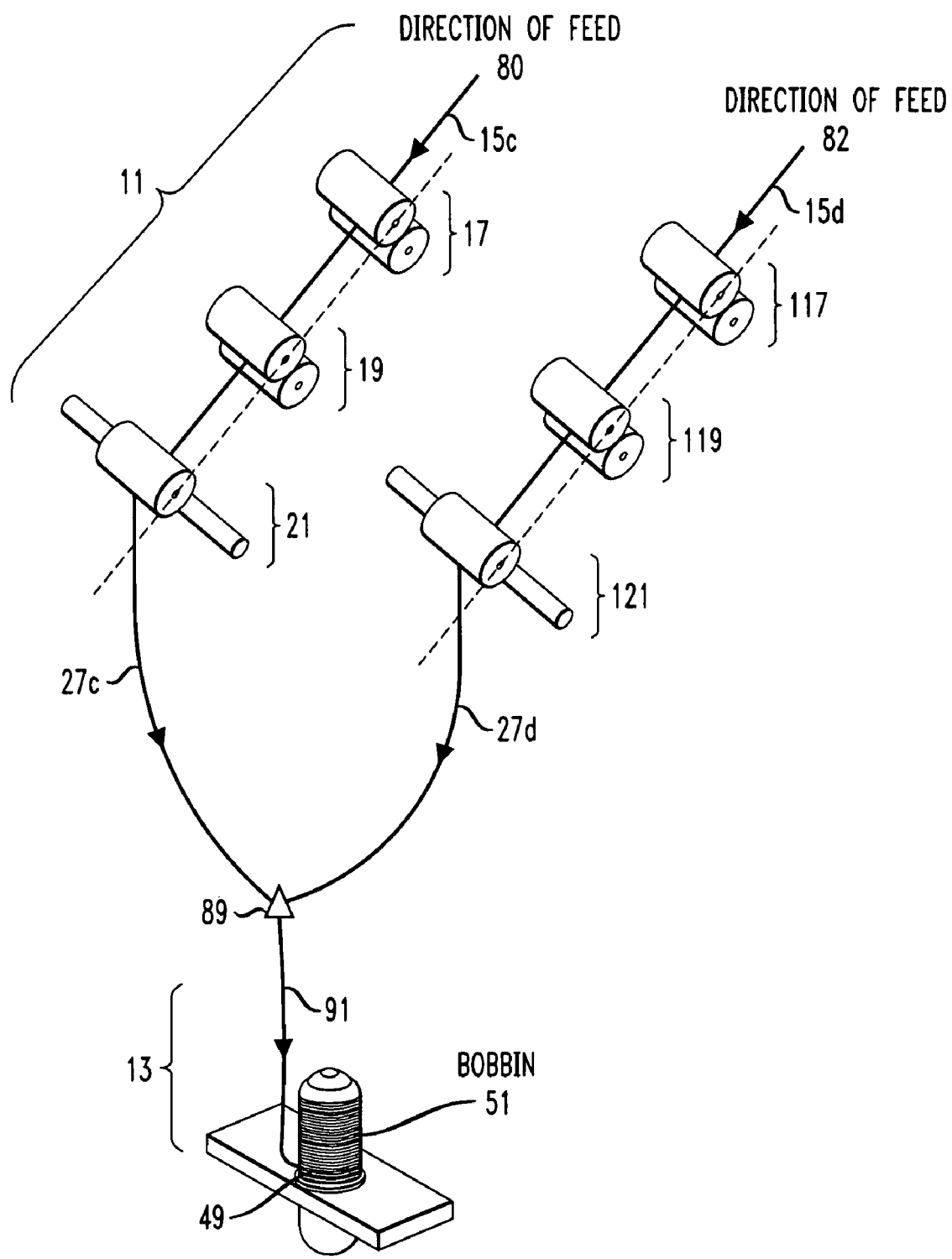
FIG. 7 depicts feeding, drafting, twisting, combining and winding materials from two groups of rollers.

FIG. 7 shows another exemplary embodiment in which drafting component 11 includes multiple groups 80, 82 of pairs of rollers. Group 80 includes roller pairs 17, 19, 21 and group 82 includes roller pairs 117, 119 and 121. Feed materials 15c and 15d are fed through the respective groups, 80, 82 of drafting component 11 to produce corresponding intermediate products 27c and 27d. Intermediate products 27c, 27d are combined at combiner 89 to produce composite intermediate product 91 which is twisted and wound onto bobbin 51 in spinning component 13 to form yarn 49. According to this exemplary embodiment, yarn 49 is a blended yarn.

Intermediate Product

The apparatus of the present invention can process a variety of different filamentous feed materials 15 as disclosed above and produce a wool-like intermediate product 27 with distinct physical characteristics from the feed material. Intermediate product 27 is characterized as being directly spinnable into yarn 49 and may be characterized as a cohesive elongated network of fibers such as oxidized PAN fibers. Unlike the well organized and aligned filaments of the precursor tow, the continuous and cohesive elongated network of fibers produced using the present invention may be a wool-like collection of random fibers with very little parallel interactions between individual fibers and no visible twist between the individual fibers. The intermediate product 27, i.e. the cohesive elongated network of fibers, may be composed of fibers from a single starting material or intermediate product 27 may also be composed of fibers from several starting materials to form a blended continuous and cohesive fibrous network capable of being spun into yarn in one further spinning step. The blended networks may be formed by drafting two or more different starting materials (filaments or fibers) on the same apparatus simultaneously or by mixing the intermediate networks obtained individually, such as described in conjunction with FIGS. 6A, 6B and 7. According to the embodiments discussed in conjunction with FIGS. 6A, 6B and 7, intermediate product 27 may therefore represent either of intermediate products 27a-d or composite intermediate products 77 and 91. In various exemplary embodiments, the different starting materials that may be combined to form an intermediate network may be stainless steel and PAN, viscose rayon and PAN, and aramid and PAN, vicous, stainless steel and PAN, and aramid material and PAN, and various other suitable combinations. Intermediate product 27 can be further processed into yarn with very small yarn count and with additional enhanced properties and characteristics, such as increased tensile strength.

Generally, an individual fiber of intermediate product 27 has a diameter of no greater than that of the original filament of the precursor fiber from which it was formed but may be a collection of individual filaments broken together and therefore having a greater diameter. The intermediate product contains multiple short wavy fibers that are randomly piled together. In one embodiment, the continuous and cohesive fibrous network is obtained from an aligned and continuous oxidized PAN tow with no greater than 192K filaments. Preferably, the precursor tow will have no greater than 96K filaments. More preferably, the precursor is small filament tow with no more than about 48K, 24K, 12K, 6K or 3K filaments. In one embodiment, each fiber of the oxidized PAN network is no longer than about 40 cm in length.

In another embodiment, the fluffy continuous and cohesive fibrous network may be obtained from an aligned and continuous stainless steel tow of no greater than 192K filaments. Preferably, the precursor stainless steel tow has no greater than about 192K filaments. More preferably, the precursor stainless steel tow has no greater than 192K filaments. Yet more preferably, the precursor stainless steel tow has no greater than 12K filaments. Each fiber of the cohesive and continuous stainless steel fibrous network has a length of no greater than 40 cm.

In yet another embodiment, the fluffy filament network is obtained from an aligned and continuous aramid filamentous material with a tow of no greater than 192K. Preferably, the precursor fiber has no greater than 96K filaments. More preferably, the precursor has no greater than 48K filaments. Yet more preferably, the precursor fiber has no greater than about 12-24K filaments. Each filament of aramid network may have a length of no greater than 40 cm in one exemplary embodiment.

Figure 8A:
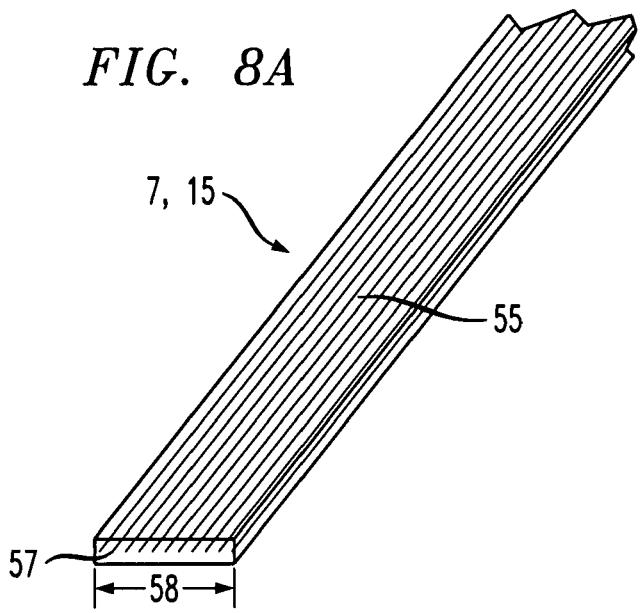
FIG. 8A is a cross sectional, perspective view of a small filament tow starting material in ribbon form.
Figure 8B:
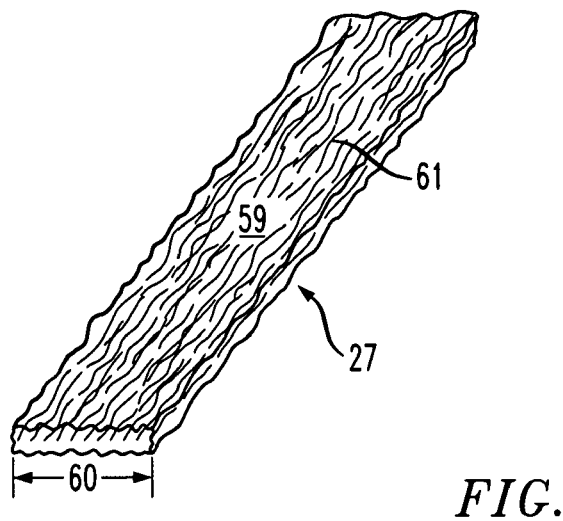
FIG. 8B is a cross sectional and perspective view of the cohesive elongated network of fibers formed from the starting material shown in FIG. 8A according to the invention.
Figure 8C:
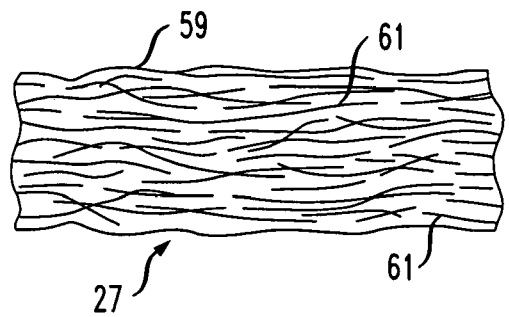
FIG. 8C is a side, cross sectional view of the cohesive elongated network of fibers shown in FIG. 8B.

FIGS. 8A-C illustrate expanded views of feed material 15 and the cohesive elongated network of fibers, intermediate product 27. In FIG. 8A, feed material 15 is in ribbon form and is formed of a plurality of longitudinally aligned filaments. Feed material 15 has smooth surface 55 and cross-section 57 is formed of cross-sections of the plurality of filaments that are relatively tightly packed and longitudinally aligned. Feed material 15 is an untwisted, flat form of starting material 7 and represents small filament tow such that the number of filaments that are longitudinally aligned to form cross-section 57 may be in the range of 3K, 6K, 12K, 24K and in other exemplary embodiments, the ribbon of tow formed of a plurality of longitudinally aligned filaments may be large filament tow, with the number of filaments in the 48K to 360K range. Each of the filaments is very long filaments which are a single continuous strand of fibrous material as described above. FIG. 8A shows filaments extending the length of the ribbon, i.e. feed material 15, with the filaments spaced apart for illustrative purposes only and it should be understood that the filaments are aligned adjacent one another and extend throughout and across feed material 15, i.e. feed material 15 and starting material 7 is formed entirely of the filaments that make up the entire cross-section. In one exemplary embodiment width 58 may be about 1.5 cm for 12K tow of oxidized PAN but other suitable dimensions may be used in other exemplary embodiments, and other dimensions may be used for other feed materials.

FIG. 8B shows the cohesive elongated network of fibers formed after processing through the drafting operation in drafting component 11. Intermediate product 27 has a wool-like appearance, i.e., it is not smooth but is rather crimped or scale-like and therefore surface 59 is not a smooth surface. Intermediate product 27 is a cohesive and continuous fibrous network having an irregular surface and may be alternatively described as a network of a random collection of untwisted truncated filaments that are held together by mechanical, physical and noncovalent chemical forces. Intermediate product 27 is generally flat (not round) when formed from a single feed material, as shown in FIG. 8B but may have other appearances in other exemplary embodiments. Width 60 will be generally the same as width 58 of feed material 15 or it may vary slightly but feed material 15 and intermediate product 27 may have substantially the same generally flat configuration in one exemplary embodiment in which intermediate product 27 represents a product formed from a single corresponding feed material 15. According to other exemplary embodiments in which intermediate product 27 is a blended or composite material form from 2 or more feed materials 15, the intermediate product will thus be an aggregate of the feed materials that combine to form it, and will have a substantially different geometry.

Intermediate product 27 has the appearance of a frayed ribbon. Now turning to FIG. 8C, individual fibers 61 that are formed by separating the originally long filaments of starting material 7, are randomly arranged and wavy. Individual fiber 61 may also be described as a truncated filament and may include a length ranging from 2-9 inches in some exemplary embodiments and in one exemplary embodiment, substantially all of the individual fibers 61 of the cohesive elongated network of fibers of intermediate product 27 may be at least 15 centimeters long. In one exemplary embodiment, substantially all of the individual fibers 61 of the cohesive elongated network of fibers of intermediate product 27 may be at least 10 centimeters long. In another embodiment, a majority of individual fibers 61 include a minimum length of 10 or 15 cm. In one exemplary embodiment, the average length of individual fibers 61 of the cohesive elongated network of fibers may be at least 10 or 15 or 20 centimeters long. In another aspect, individual fibers 61 have a length within a range of about 2.5 cm to about 23 cm. In other exemplary embodiments, the average length of individual fibers 61 will vary and in yet another exemplary embodiment, individual fibers 61 represent fibers from multiple starting materials, i.e., individual fiber 61 representing a collection of fibers formed by stretch breaking filaments of different starting tow materials. According to this exemplary embodiment, individual fibers 61 may represent a plurality of different fibers, each with an associated average length determined by the starting material used and the conditions of drafting component 11 with respect to the particular feed material 15.

In another embodiment 100% of the fibers are oxidized PAN fibers having a length within a range of about 15 cm to about 23 cm. The length and distribution of lengths of fibers 61 enhance the characteristics of yarn formed by spinning and twisting intermediate product 27 such that the yarn includes an increased knittability compared to conventional yarns formed from oxidized PAN and may be more easily knitted, woven or crocheted into various fabrics. These characteristics are achievable without the addition of strengthening fibers to the yarn or intermediate product such as required in conventional materials or using conventional methods.

In one aspect, the fire retardant and heat resistant yarn may include 100% oxidized polyacrylonitrile (PAN) fibers in which the fibers have an average length greater than about 10 cm. The fibers may alternatively have an average length greater than about 15 cm. The fibers may each have a length within a range of about 2.5 cm to about 23 cm. According to another aspect, the yarn may include blended yarns such as described in conjunction with FIGS. 6A, 6B and 7, or composite yarns as described below.

Post-Processing

The yarn produced from cohesive elongated network of fibers of intermediate product 27 according to the present invention can be further processed mechanically and/or chemically. The networks can be readily spun into yarn using the aforementioned or other conventional processes. The yarn formed of 100% oxidized PAN exhibits an increased knittability without strengthening fibers compared to conventional yarns formed from oxidized PAN. The yarn may be used in substantially any desired fabricated form, woven or non-woven. The yarn can then be woven, stitched, braided, knitted, crocheted or formed into non-woven sheets, as well as other flat or three-dimensional shaped structures. Exemplary products obtained through mechanical processing are herringbone weave cloth, twill weave tape, tubular woven fabric, paper, blankets, roving, yarn, cord, and rope. Filamentous materials can also be formed directly into sheets and other structures, either alone or in combination with other filaments, fibers, or compositions, such as resin.

The cohesive elongated network of fibers may also be treated chemically to impart new characteristics before or after being spun into yarns. For example, the cohesive elongated network of fibers may be fluorinated as disclosed in U.S. Pat. No. 4,857,394 so as to provide flexible fibers with different electrical conductivity. Another example is to convert oxidized PAN fibrous networks into carbon fibers by pyrolysis. This process involves two steps: carbonization and graphitization. During the carbonization process, the oxidized PAN may be carbonized by stretching and further heating to a temperature of about 1000 to 1500° C. to remove non-carbon elements and form the carbonized PAN structurally illustrated in FIG. 1. Carbonized PAN includes a higher carbon content than oxidized PAN and generally a carbon content of 90% or greater. Another aspect of the invention is the yarn described above and downstream products formed from the yarn, but formed of PAN that has been carbonized to carbonized PAN. During graphitization, the fiber is further treated at temperatures between about 1,500-3,000° C. to improve the ordering and orientation of the crystallites in the direction of the fiber axis.

Figure 9:
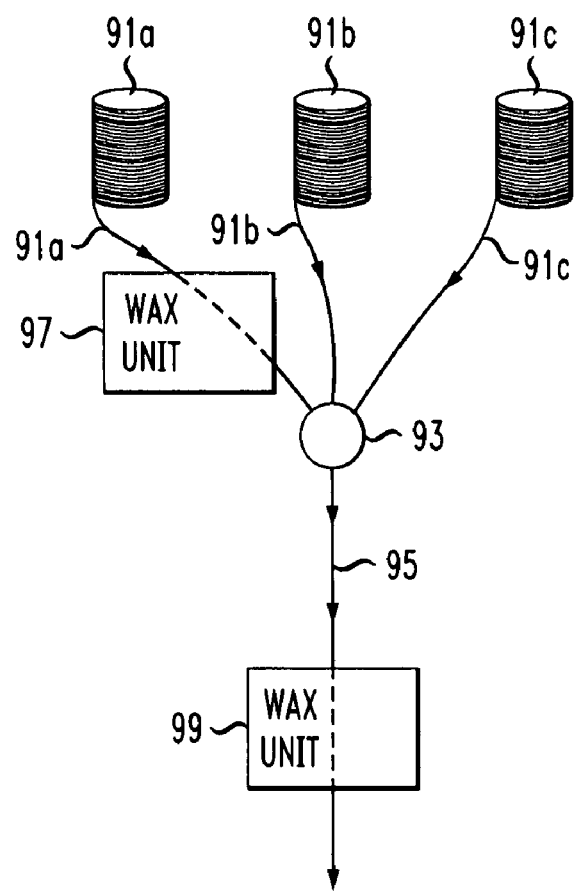
FIG. 9 depicts the combining and waxing of multiple yarns according to another aspect of the invention.

Other aspects of the invention are shown in FIG. 9 which illustrates waxing and the formation of a composite yarn from individual yarns. FIG. 9 shows yarns 91a, 91b and 91c, each of which may be on a respective bobbin (not shown) such as bobbin 51 of spinning component 13. Each of the yarns 91a, 91b, and 91c may be as described for yarn 49 which may be blended yarns such as when formed from composite intermediate products 77, 91 such as shown in FIGS. 6A and 7, respectively. Yarns 91a, 91b and 91c are combined by twisting at combiner 93 to form composite yarn 95. Combiner 93 may be any of various suitable mechanical structures used to combine yarns by twisting to provide a composite yarn 95. The yarns may be optionally individually waxed such as by individual wax unit 97 or they may be waxed using conventional methods after combines to form composite yarn 95 using wax unit 99.

Applications

The cohesive elongated network of fibers and the yarns produced by the process of the present invention can be used as intermediates for the production of a range of industrial, commercial and consumer products such as described above.

For example, oxidized PAN fibers are chemically resistant, thermally stable, and physiologically harmless. The fibrous networks also have excellent processing properties such as superior blending and handing characteristics. They are ideally suited for heat resistant, thermal and acoustic insulation and technical textiles. The oxidized PAN fibrous networks can also be used as asbestos replacing additives in friction linings of automotive disc and drum brakes.

The oxidized PAN filaments and their downstream products such as yarns and fabrics can be formed into consumer products and/or further processed under high temperatures into carbon fibers that have very high flame proof characteristics and are electrically conductive. Consumer products include various textiles such as blankets, jacket linings, boot linings, helmet linings, jerseys, shirts, pants, balaclavas, and the like.

Such carbon-fiber based materials are also useful in the production of a variety of industrial and consumer products, such as apparel and other textile-based products, belts and hoses, composites, fiber optics, electromechanical materials, friction sensitive products such as gaskets and brake pads, tires, ropes and cables. The fibrous networks can also be processed into activated PAN fiber using various suitable known methods. This activated PAN product has very high surface area thus has high adsorption rate and capacity. It can be used to develop air filter, mask, water purification, odor adsorbing cloth, and protecting clothing.

In another embodiment, the PAN fibers and products may be impregnated with various suitable additives to impart various desired qualities. Such carbon-fiber based impregnated materials find various industrial applications and are also useful in the production of a variety of industrial and consumer products, such as apparel and other textile-based products, belts and hoses, composites, fiber optics, electromechanical materials, friction sensitive products such as gaskets and brake pads, tires, ropes and cables, filtration systems such as air filters, masks, water purification systems, odor adsorbing cloth, and other protecting clothing.

Fabrics formed from oxidized or further processed PAN such as carbonized PAN and activated PAN formed according to the invention exhibit superior tensile strength and knittability compared to fabrics of 100% PAN formed using conventional methods, which require the addition of strengthening fibers or encapsulation to function as viable textiles or fabrics. An aspect of the invention is the production of oxidized, carbonized or activated PAN fabrics and other textiles formed from yarn produced according to the invention without the use of strengthening fibers or without encapsulating the formed fabrics.

Fabrics formed from the blended yarns described above and the composite yarns described above are also used to produce various combinations of characteristics. The yarns may be woven to form fabrics, knit to form fabrics or a warped knit, i.e., blend between woven and knit, fabric may be produced. For example, 100% oxidized PAN may be combined to form a blended or composite yarn to reduce costs. According to one exemplary embodiment, various oxidized PAN materials may be combined with viscose rayon to make a twisted or composite yarn which is dye-able. According to another exemplary embodiment, a composite yarn or blended yarn formed of oxidized PAN and stainless steel may be used to provide various advantageous aspects.

The materials of the invention may be used to form many different fabrics and these fabrics may be combined together or with other fabrics to form a composite material such as a 3-part sandwich with a 100% oxidized PAN fabric in the center and other materials such as cotton or wool or further fabric such as dye-able fabrics formed according to any of the aforementioned processes and from any of the aforementioned yarns, including blended and composite yarns. According to one exemplary embodiment, an oxidized PAN fabric may be used in conjunction with a phase change material capable of storing or releasing heat or cold.

Figure 10:
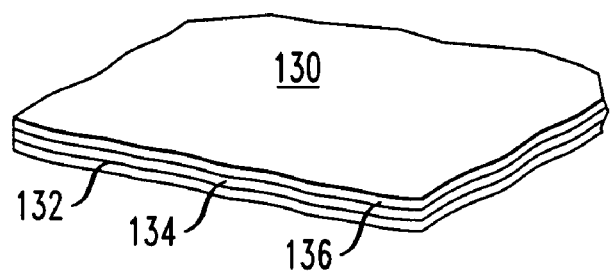
FIG. 10 illustrates a composite material formed to include layers of fabrics according to the present invention.

FIG. 10 is a perspective view of a product 130 formed of a plurality of fabrics 132, 134, 136 which may each be formed according to the methods of the invention. In one exemplary embodiment, middle fabric 134 may be oxidized, carbonized or activated PAN such as 100% oxidized PAN and outer fabrics 132, 136 may be formed of any of the various materials described herein. Either or all of fabrics 132, 134, 136 may be formed from a composite yarn or a blended yarn as described herein. Product 130 may represent a portion of various products described herein including, but not limited to the products described in the following paragraph.

Figure 11:
FIG. 11 illustrates exemplary products formed of the materials and yarns of the invention.
Figure 11:
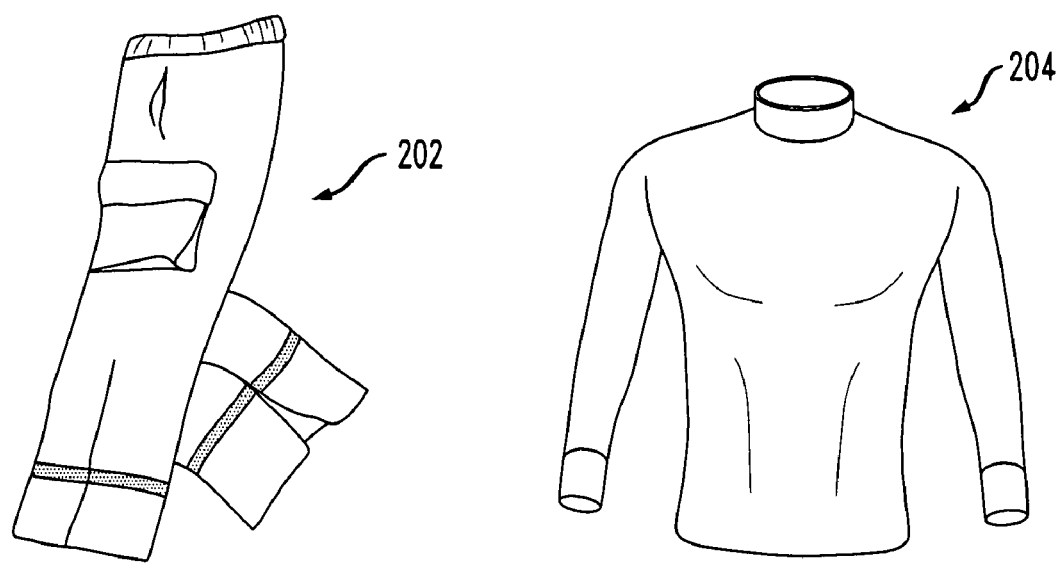

The materials of the invention may be used in various applications to produce products such as fire-resistant clothing including underwear, jackets and pants. FIG. 11 illustrates an exemplary jacket 200, firefighter pants 204 and undergarment 204. In other embodiments, the materials of the invention may be used to produce products such as thermal insulation and industrial filters, heat shields for automotive disk brakes, electrical insulation such as papers and pressboards and high-temperature filtration applications for pollution control. The products may be used in other applications ranging from aircraft and railroad car interior textiles (including upholstery, floor coverings, bulkheads and wall coverings) to contract furnishings for hotels, offices, auditoriums, hospitals and day care centers. The products in the wide range of applications may be produced using various manufacturing methods known in the art. The above listed products are intended to be representative and illustrative of the various products that can be made according to the methods and using the materials of the invention.

EXAMPLES

The following are examples of methods for producing the inventive cohesive elongated network of fibers and yarns are intended to be exemplary and not restrictive of the methods, apparatus configurations and products of the invention. The exemplary apparatus for each of the following examples had either two or three pairs of rollers as indicated in each example. All of the rollers attached to the apparatus had the same diameter of 31.84 mm. All of the rollers attached to the pendulum had cots with the same hardness of 75 according to the Shore A hardness scale.

Example I

Oxidized PAN Fiber Network Produced from a Tow of 6K Filaments

The precursor material is an oxidized PAN with a tow size of 6K, a tow denier of 7,200, and tow weight of 0.8 g/meter. Its general physical properties are summarized in Table 1. The precursor material contains parallel filaments of a uniform length equal to the length of tow, which often exceeds 2 meters. The filament is also well organized and aligned longitudinally. Additionally, the precursor fiber has very limited twists, typically less than 5 turns per meter. The oxidized PAN fiber was drafted using the apparatus with two pairs of rollers, the first rollers and last rollers. The distance between two rollers attached to the apparatus was set to about 240 mm. To obtain a draft ratio of 27.2, the speeds of the last and preceding rollers were set at 227 and 8.3 rpm, respectively. The same pressure was applied to both pairs of rollers. The pressure was adjusted to about 28 Kg by varying the weight on the pendulum carrier. The drafting process broke and randomized the long and organized filaments of the precursor fiber to form a fluffy web which has very little parallel interactions between the individual fibers formed by breaking and stretching the filaments, and no visible twist between the individual fibers. The fibers of the cohesive elongated network of fibers appear wavy and have lengths no greater than about 22 cm and a width of no greater than 12 micrometers. The network has an average weight of about 0.077 g/10 cm.

TABLE 1

| Physical Properties | Data |
| --- | --- |
| Filament denier | 1.2 denier |
| Density | 1.40 g/cm$^3$ |
| Single filament diameter | 11 micrometer |
| Tensile strength | 2.0 g/denier |
| Elastic modulus | 450 Kg/mm$^2$ |
| Moisture regain | 9% |
| Strength at break | 14 CN/tex |
| Elongation at break | 10% |
| LOI | 55 |

The cohesive elongated network of fibers was further processed by winding and twisting in one operation to yield a yarn with a yarn count of 34 Nm, a tensile strength of 250-300 g, a tensile elongation of 10%, and a twist count of 525 (T/meter).

Example II

Oxidized PAN Network Produced from a Filamentous Starting Material with a 12K Tow The precursor material is an oxidized PAN with a tow size of 12K, a tow denier of 14,400, and tow weight of 1.6 g/meter. Its general physical properties are summarized in Table 1. The precursor material contains parallel filaments of a uniform length equal to the length of tow, which often exceeds 2 meters. Additionally, the filaments of the precursor material have very limited twists, typically less than 5 turns per meter. The oxidized PAN was drafted using the apparatus having only first and last pairs of rollers. The distance between the rollers attached to the apparatus was set to about 240 mm. To obtain a draft ratio of 8, the speeds of the first and last rollers were set at 125 and 15.6 rpm, respectively. The pressures applied onto the first and last rollers were 45 and 50 Kg, respectively. The pressure was adjusted by varying the weight on the pendulum carrier and the position of the pendulum on the pendulum carrier. The drafting process broke and randomized the long and organized filaments of the precursor fiber to form a wool-like network of truncated filaments, with very little parallel interactions between individual fibers and has no visible twists between individual filaments. The fibers of the network formed by separating the original filaments appear wavy and have a length of no greater than about 22 cm and a width of no greater than about 12 micrometers. The network has an average weight of about 0.159 g/10 cm.

The cohesive elongated network of fibers was further processed by winding and twisting to yield a yarn with a yarn count of 5 Nm, a tensile strength of about 2000 g, a tensile elongation of 10%, and a twist count of 100 (T/meter).

Example III

An Oxidized PAN Network Produced from Two Feeding Materials

This example illustrates the drafting of two fibers of the same type simultaneously. However, the drafting process is equally applicable to two or more fibers of different kinds. The two incoming materials were fed using a feeding component as depicted in FIG. 1. The two precursor fibers are oxidized PAN with a tow size of 6K, a tow denier of 7,200, and tow weight of 0.8 g/meter. Their general physical properties are summarized in Table 1. The precursor contains parallel filaments of a uniform length equal to the length of tow, which often exceeds 2 meters. The filaments are also well organized and aligned longitudinally. Additionally, the precursor fiber has very limited twists, typically less than 5 turns per meter. The oxidized PAN fibers were drafted using the apparatus with two pairs of rollers. The distance between the two rollers attached to the apparatus was set to about 240 mm. To obtain a draft ratio of 27.2, the speeds of the rollers were set at 227 and 8.3 rpm, respectively. The same pressure was applied to both pairs of rollers. The pressure was adjusted to about 28 Kg by varying the weight of a pendulum on the pendulum carrier. The drafting process broke and randomized the long and organized filaments of the precursor fibers to produce a wool-like fibrous network which has very little parallel interactions between individual fibers and has no visible twist between the individual fibers. The fibers of the network appear wavy and have lengths of about no greater than about 22 cm and a width of no greater than about 12 micrometers. The network has average weight of about 0.154 g/10 cm.

The cohesive elongated network of fibers was further processed by winding and twisting to yield a yarn with a yarn count of 17 Nm, a tensile strength of about 500-600 g, a tensile elongation of about 10%, and a twist count of about 375 (T/meter).

Example IV

A Stainless Steel Fibrous Network

The precursor is a stainless steel fiber with a tow size of 4K, and tow weight of 1.6 g/meter. In addition to its major chemical element, iron (Fe), the steel also contains several other elements as listed in Table 2.

The precursor fiber contains parallel filaments of a uniform length equal to the length of tow, which often exceeds 2 meters. The filaments are also well organized and aligned longitudinally. Additionally, the filaments of the precursor material have very limited twists, typically less than 5 turns per meter. The filament has a tenacity strength of 7.5 CN and a diameter of 8 micrometer. The stainless steel incoming material was drafted using the apparatus with three pairs of rollers. The distance between the first and second rollers attached to the apparatus was set to be 100 mm whereas the distance between the second and the third rollers attached to the apparatus was set to be 140 mm. To obtain a draft ratio of 17.6, the speeds of the first, second and third rollers were set at 200, 11.4, and 10.8 rpm, respectively. The same pressure was applied to the first and second rollers and was set at 42 Kg. The pressure applied onto the first rollers was set at 45 Kg. Similar to the previous examples, the pressure was adjusted by varying the weight of the pendulum and the position of the pendulum on the pendulum carrier. The drafting process broke and randomized the long and organized filaments of the precursor to form a wool-like fiber network having very little parallel interactions between individual fibers and has no visible twist between the individual fibers. The fibers of the network formed from the incoming filaments appear wavy and have a length of no greater than about 10 cm and a width of about 8 micrometers. The network has an average weight of about 0.16 g/10 cm.

TABLE 2

| Chemical Compositions | Percent (%) |
|---|---|
| C | 0.03 |
| Si | 1.0 |
| Mn | 2.0 |
| Ni | 10.0-14.0 |
| Cr | 16.0-18.0 |

The filament network was further processed by winding and twisting to yield a yarn with a yarn count of 11 Nm and a twist count of 500 (T/meter).

Example V

Aramid Filament Network Produced from a 1K Tow Aramid Starting Material

The precursor feed material is an aramid material with a tow size of 1K, a tow denier of 1,530, and tow weight of 0.17 g/meter. Its general physical properties are summarized in Table 3. The precursor contains parallel filaments of a uniform length equal to the length of tow, which often exceeds 2 meters. The filaments are also well organized and aligned longitudinally and have a diameter of 12 micrometers. Additionally, the precursor filaments have very limited twists, typically less than 5 turns per meter. The aramid material was drafted using the apparatus with two pairs of rollers, the first and last rollers. The distance between the first and last rollers mounted on the apparatus was about 240 mm. To obtain a draft ratio of 8.5, the speeds of the first and last rollers were set at 170 and 10 rpm, respectively. The pressures applied onto the first and last rollers were above about 42 and 45 Kg, respectively. The pressure was adjusted by varying the weight of the pendulum and the position on the pendulum carrier. The precursor aramid material was drafted twice. The first drafting resulted in a stretching of the filaments. The second drafting broke and randomized the long and organized filaments of the precursor to form a wool-like fiber network which has very little parallel interactions between individual fibers and has no visible twist between the individual fibers. The fibers of the network appear wavy and have a length of no greater than about 22 cm and a width of about 12 micrometers. The network has an average weight of about 0.015 g/10 cm.

TABLE 3

| Physical Properties | Data |
|---|---|
| Filament denier | 1.53 denier |
| Tenacity | 23 g/denier |
| Tensile strength | 3,000 N/mm$^2$ |
| Tensile modulus | 67 kN/mm$^2$ |
| Elongation at break | 3% |
| Filament diameter | 12 micrometer |
| Density | 1.38 g/cm$^3$ |
| Decomposition point | 500 |
| LOI | 29 |

The cohesive elongated network of fibers was further processed by winding and twisting to produce a yarn with a yarn count of 50 Nm and a twist count of 800 T/meter.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents.

The written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended, and those skilled in the art will recognize, that the invention embraces and is also thereby described in terms of any individual member or subgroup of members of the Markush group.

Other embodiments are within the following claims. The patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for producing a cohesive elongated network of fibers comprising:
    providing a first starting material comprising a first tow of filaments forming a first ribbon;
    providing a second starting material comprising a second tow of filaments forming a second ribbon;
    drawing said first starting material through a first pair of rollers and a second downstream pair of rollers of a drafting component, said first pair of rollers being spaced about 50 mm to about 240 mm from said second pair of rollers, said second pair of rollers having a second rotational speed that is faster than a first rotational speed of said first pair of rollers, thereby stretching and breaking said filaments of said first tow of filaments to form a first cohesive elongated network of fibers formed by said stretching and breaking said filaments of said first tow of filaments;
    drawing said second starting material through a third pair of rollers and a fourth downstream pair of rollers of said drafting component, said fourth pair of rollers having a fourth rotational speed that is faster than a third rotational speed of said third pair of rollers, thereby stretching and breaking said filaments of said second tow of filaments to form a second cohesive elongated network of fibers formed by said stretching and breaking said filaments of said second tow of filaments; and
    combining said first cohesive elongated network of fibers and said second cohesive elongated network of fibers.

2. The method as in claim 1, wherein said combining comprises blending said first and second cohesive elongated networks of fibers into a blended cohesive elongated networks of fibers then twisting and winding said blended cohesive elongated network of fibers into a blended yarn in one single further step.

3. The method as in claim 1, further comprising twisting and winding said first cohesive elongated network of fibers into a first yarn in one single step and twisting and winding said second cohesive elongated network of fibers into a second yarn in one single step and wherein said combining comprises combining said first and second yarns by twisting to form a composite yarn.

4. The method as in claim 1, wherein said first starting material comprises oxidized PAN and said second starting material comprises stainless steel.

5. The method as in claim 1, wherein said first starting material comprises oxidized PAN and said second starting material comprises one of a para-aramid material and a meta-aramid material.

6. The method as in claim 1, wherein said first starting material comprises oxidized PAN and said second starting material comprises a dye-able material.

7. A method for producing a cohesive elongated network of fibers comprising:
providing a first starting material comprising a first tow of filaments forming a first ribbon;
providing a second starting material comprising a second tow of filaments forming a second ribbon;
drawing said first starting material through a first pair of rollers and a second downstream pair of rollers of a drafting component, said first pair of rollers being spaced about 50 mm to about 240 mm from said second pair of rollers, said second pair of rollers having a second rotational speed that is faster than a first rotational speed of said first pair of rollers, thereby stretching and breaking said filaments of said first tow of filaments to form a first cohesive elongated network of fibers formed by said stretching and breaking said filaments of said first tow of filaments;
drawing said second starting material through said first pair of rollers and said second downstream pair of rollers, thereby stretching and breaking said filaments of said second tow of filaments to form a second cohesive elongated network of fibers formed by said stretching and breaking said filaments of said second tow of filaments; and
combining said first cohesive elongated network of fibers and said second cohesive elongated network of fibers.

8. The method as in claim 7, wherein said drawing said first starting material and said drawing said second starting material comprise maintaining said first and second cohesive elongated networks of fibers material separately when exiting said second downstream pair of rollers, said combining comprises blending said first and second cohesive elongated networks of fibers together to form a composite cohesive elongated networks of fibers, and further comprising twisting and winding to convert said composite cohesive elongated networks of fibers into yarn in one single further step.

9. The method as in claim 7, wherein said drawing said first starting material and said drawing said second starting material comprise said first starting material contacting said second starting material when said first and second starting materials are drawn through at least one of said first pair of rollers and said second pair of rollers.

10. The method as in claim 7, wherein said drawing said first starting material, said drawing said second starting material and said combining comprise combining said first and second cohesive elongated networks of fibers material to form a composite cohesive elongated networks of fibers, said composite cohesive elongated network of fibers comprising fibers from said first tow of filaments and said second tow of filaments, and further comprising twisting and winding said composite cohesive elongated network of fibers directly into yarn in one single further step.

11. The method as in claim 7, further comprising twisting and winding each of said composite cohesive elongated network of fibers directly into yarn in one single further step prior to said combining.

12. The method as in claim 7, further comprising waxing said yarn.

13. The method as in claim 7, wherein said first starting material comprises oxidized PAN and said second starting material comprises stainless steel.

14. The method as in claim 7, wherein said first starting material comprises oxidized PAN and said second starting material comprises one of a para-aramid material and a meta-aramid material.

15. The method as in claim 7, wherein said first starting material comprises oxidized PAN and said second starting material comprises a dye-able material.

16. The method as in claim 7, wherein said drawing said first starting material and said drawing said second starting material further comprises applying a force that urges said first pair of rollers toward each other and said second pair of rollers toward each other, said applying a force comprising applying pressure via a pendulum to urge said first pair of rollers into a conterminous relationship and said second pair of rollers into a conterminous relationship.

17. The method as in claim 7, further comprising providing each said starting material on a tension disk and further comprising providing tension to maintain said each said starting material in said flat and untwisted form when said respective ribbon is fed between said first pair of rollers.

18. The method as in claim 7, wherein each said first and second cohesive elongated networks of fibers is wool-like and said fibers are wavy and randomly oriented within said respective cohesive elongated network of fibers, said fibers having an average length greater than about 15 cm, substantially all of said fibers having a length within a range of about 2.5 to 23 cm.

19. A method for producing a cohesive elongated network of fibers comprising:
providing a first starting material comprising a first tow of filaments forming a first ribbon;
providing a second starting material comprising a second tow of filaments forming a second ribbon;
drawing said first and said second starting materials simultaneously through a first pair of rollers and a second downstream pair of rollers of a drafting component, said first pair of rollers being spaced about 50 mm to about 240 mm from said second pair of rollers, said second pair of rollers having a second rotational speed that is faster than a first rotational speed of said first pair of rollers, thereby stretching and breaking said filaments of said first tow of filaments and said filaments of said second tow of filaments to form a cohesive elongated network of fibers formed by said stretching and breaking said filaments, said cohesive elongated network of fibers comprising fibers from said first tow of filaments and said second tow of filaments; and
twisting and winding said cohesive elongated network of fibers directly into yarn in one single further step.

20. The method as in claim 19, wherein said first starting material comprises oxidized PAN and said second starting material comprises one of an aramid material and stainless steel.

21. An apparatus for converting a plurality of ribbons of tow into yarn, each ribbon of tow comprising a plurality of longitudinally aligned filaments, into yarn, said apparatus comprising:
a first pair of substantially conterminous rollers having a first rotational speed and receiving at least two of said plurality of ribbons of tow therebetween;
a second pair of substantially conterminous rollers positioned about 50 mm to about 240 mm downstream from said first pair of rollers and having a second rotational speed greater than said first rotational speed thereby stretching and breaking substantially all of said plurality of longitudinally aligned filaments from each of said respective ribbons of tow, to form at least one cohesive elongated network of fibers consisting of a collection of randomly oriented fibers formed by breaking said filaments;

a pressurizing element that applies pressure that urges said first pair of rollers toward each other and said second pair of rollers toward each other; and means for converting said at least one cohesive elongated network of fibers directly into yarn in one twisting and winding step.

22. The apparatus as in claim 21, wherein said at least one cohesive elongated network of fibers comprises a plurality of cohesive elongated networks of fibers, further comprising means for blending said plurality of cohesive elongated networks of fibers into a composite cohesive elongated networks of fibers and said means for converting converts said composite cohesive elongated network of fibers directly into a blended yarn in one twisting and winding step.

23. The apparatus as in claim 21, wherein said at least one cohesive elongated network of fibers comprises a single cohesive elongated network of fibers including fibers from each of said plurality of ribbons of tow and said means for converting converts said cohesive elongated network of fibers directly into a blended yarn in one twisting and winding step.

24. The apparatus as in claim 21, further comprising means for waxing said yarn.

25. The apparatus as in claim 21, further comprising:

a third pair of substantially conterminous rollers having a first rotational speed and receiving a third of said plurality of ribbons of tow therebetween;

a fourth pair of substantially conterminous rollers downstream from said third pair of rollers having a second rotational speed greater than said third rotational speed thereby stretching and breaking substantially all of said plurality of longitudinally aligned filaments from said third ribbon of tow, to form a further cohesive elongated network of fibers consisting of a collection of randomly oriented fibers formed by breaking said filaments of said third ribbon of tow;

a further pressurizing element that applies pressure that urges said third pair of rollers toward each other and said fourth pair of rollers toward each other; and means for combining said further cohesive elongated network of fibers with said at least one cohesive elongated network of fibers to form a composite.

26. The method of claim 1, wherein said third pair of rollers are spaced between about 50 mm to about 240 mm from said fourth pair of rollers.

27. The method of claim 1, wherein substantially all of said fibers of at least one of said first cohesive network of fibers and said second cohesive network of fibers have a length within a range of about 2.5 to 23 cm.

28. The method of claim 2, wherein said twisting causes said yarn to have a twist count of about 100 twists per meter to about 800 twists per meter.

29. The method of claim 8, wherein said twisting causes said yarn to have a twist count of about 100 twists per meter to about 800 twists per meter.

30. The method of claim 19, wherein said twisting causes said yarn to have a twist count of about 100 twists per meter to about 800 twists per meter.

31. The method of claim 19, wherein substantially all of said fibers of said cohesive network of fibers have a length within a range of about 2.5 to 23 cm.

32. The apparatus of claim 21, wherein said means for converting is operable to cause said yarn to have a twist count of about 100 twists per meter to about 800 twists per meter.

33. The apparatus of claim 21, wherein substantially all of said fibers of said at least one cohesive network of fibers have a length within a range of about 2.5 to 23 cm.

* * * * *

UNITED STATES PATENT AND TRADEMARK OFFICE
CERTIFICATE OF CORRECTION

PATENT NO. : 8,117,815 B2
APPLICATION NO. : 11/804187
DATED : February 21, 2012
INVENTOR(S) : Tung-Yuan Ke It is certified that error appears in the above-identified patent and that said Letters Patent is hereby corrected as shown below:

In the specification,

In Column 23, line 12, change micrometers to millimeters.

In Column 23, line 62, change micrometers to millimeters.

In Column 24, line 32, change micrometers to millimeters.

In Column 25, line 6, change micrometers to millimeters.

In Column 25, lines 52 and 53, change micrometers to millimeters.

Signed and Sealed this
Twenty-fourth Day of November, 2015

Michelle K. Lee
*Director of the United States Patent and Trademark Office*